(12) United States Patent
Moteki et al.

(10) Patent No.: US 7,590,030 B2
(45) Date of Patent: Sep. 15, 2009

(54) GOVERNOR AND A POWER GENERATING DEVICE AND AN APPARATUS USING THE GOVERNOR

(75) Inventors: Masatoshi Moteki, Shiojiri (JP); Osamu Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 246 days.

(21) Appl. No.: 11/543,133

(22) Filed: Oct. 5, 2006

(65) Prior Publication Data

US 2007/0079657 A1    Apr. 12, 2007

(30) Foreign Application Priority Data

Oct. 6, 2005 (JP) .............................. 2005-293875
Jun. 28, 2006 (JP) .............................. 2006-178251
Jul. 10, 2006 (JP) .............................. 2006-189813

(51) Int. Cl.
G04B 21/02 (2006.01)
G04B 25/00 (2006.01)
G01F 1/06 (2006.01)
H02K 7/10 (2006.01)

(52) U.S. Cl. .................... 368/75; 368/272; 84/94.1; 310/77; 475/260

(58) Field of Classification Search ............. 368/72–75, 368/128, 260, 269–273; 84/94.1–95.2; 74/114, 74/336.5; 310/68 E, 77; 475/258–260
See application file for complete search history.

(56) References Cited

U.S. PATENT DOCUMENTS 1,346,228 A    7/1920    Manson (Continued)

FOREIGN PATENT DOCUMENTS

CH    130529 A    12/1928

(Continued)

OTHER PUBLICATIONS

"Element of precise equipmentII", written by O. Richter, Translated by Teizo Maeda, Sep. 15, 1958, Shoko Publication, Tokyo, Japan. p. 541 lines 12-17; p. 542 figs. 1568, 1569; p. 544 fig. 1571; p. 545 figs. 1572, 1573; p. 546 fig. 1574; p. 548 figs. 1575, 1576; p. 551 fig. 1581; p. 553 figs. 1583, 1584, 1585; p. 556 lines 5-9; p. 559 lines 10-13; p. 560 figs. 1596, 1597; p. 561 figs. 1598, 1599; p. 565 lines 4-8; p. 565 fig. 1606; p. 566 lines 24-27; p. 567 lines 11-18; p. 568 figs. 1607, 1608; p. 571 line 23—p. 573 line4; fig. 1613; p. 574 figs. 1616, 1617.

(Continued)

*Primary Examiner*—Vit W Miska
(74) *Attorney, Agent, or Firm*—Global IP Counselors, LLP

(57) ABSTRACT

It is intended to provide a governor that is small, does not produce wear particles or noise, is low cost, is not affected by differences in attitude, is not affected by magnetism, and has outstanding durability. The governor has a rotor that rotates using energy supplied from an energy storage means through a power transfer means, a wing having wing surfaces perpendicular to the rotational axis of the rotor, and disposed movably to an outside circumference side radially to the rotor by means of centrifugal force produced by rotor rotation, a zigzag spring disposed between the rotor and wing for pulling the wing to the inside circumference side radially to the rotor, and an opposing member disposed to the outside circumference of the rotor and having an opposing surface located opposite and separated a predetermined gap from the wing surface when the wing moves to the outside circumference side radially to the rotor.

18 Claims, 21 Drawing Sheets

U.S. PATENT DOCUMENTS

| | | | | | |
|---|---|---|---|---|---|
| 4,458,573 | A | * | 7/1984 | Isaka | 84/95.1 |
| 4,464,969 | A | * | 8/1984 | Isaka et al. | 84/95.1 |
| 4,557,173 | A | * | 12/1985 | Isaka | 84/95.1 |
| 4,777,394 | A | * | 10/1988 | Hayashi | 310/83 |
| 4,890,528 | A | * | 1/1990 | Kamijima | 84/95.2 |
| 5,179,236 | A | * | 1/1993 | Shimotori et al. | 84/95.1 |
| 5,449,856 | A | * | 9/1995 | Nakamori | 84/95.1 |
| 5,543,577 | A | * | 8/1996 | Zhu et al. | 84/95.2 |
| 5,936,171 | A | * | 8/1999 | Zhu et al. | 84/94.1 |
| 5,949,004 | A | * | 9/1999 | Orii et al. | 84/95.1 |

FOREIGN PATENT DOCUMENTS

| | | |
|---|---|---|
| EP | 1126333 A1 | 8/2001 |
| JP | 2506895 B | 4/1996 |
| JP | H11-166980 A | 6/1999 |

OTHER PUBLICATIONS

"The Complication Watches", Nov. 20, 1995, Watch of the world vol. 24, pp. 69-73. World Photo Press Co. Tokyo, Japan. Patek Minute repeater, Perpetual calendar, Caliber R27Q; p. 2 col. 1 line 19—col. 2 line 10.

* cited by examiner

GOVERNOR AND A POWER GENERATING DEVICE AND AN APPARATUS USING THE GOVERNOR

CROSS REFERENCE TO RELATED APPLICATION

This application claims priority to Japanese Patent Application Nos. 2005-293875, 2006-178251, and 2006-189813. The entire disclosure of Japanese Patent Application Nos. 2005-293875, 2006-178251, and 2006-189813 is hereby incorporated herein by reference.

BACKGROUND OF THE INVENTION

1. Field of Technology

The present invention relates to a governor that uses the viscosity of a fluid, and relates to a power generating device and to an apparatus that use the governor.

2. Description of Related Art

In order to keep an apparatus that uses an energy storage means, which stores, for example, the mechanical energy of a spring, the potential energy of a counterweight, or the thermal energy of heat accumulated in or extracted from a sealed bellows type container, as the drive power source operating at a constant speed, a governor is used to gradually release the stored energy.

The governor may be a mechanical governor or an electronically controlled governor.

An electronically controlled governor has a generator that is driven rotationally by stored energy and governs the rotational speed by electronically controlling rotation of the generator. Electronically controlled governors enable precise speed control, and are used, for example, to control driving the hour, minute, and second hands in a timepiece. See, for example, Japanese Unexamined Patent Application Publication H11-166980.

This type of electronically controlled governor requires a generator having a stator, coil, and rotor, and is therefore relatively large and relatively expensive. Mechanical governors may therefore be used instead depending upon the application.

Various types of mechanical governors are known from the literature and are widely used. See, for example, "Elements of precision devices II," Richter, O. and Force, R. (Shoko Shuppan-sha K. K. (1958 Sep. 15, pp. 534-575); in Japanese) in which mechanical governors are classified in the following major groups.

(1) Brake-type Governors (1-1) Brake-type Governors that use Solid Friction

FIG. 1568, FIG. 1569: governors that push a friction member against the inside circumference of a flange radially to the direction of rotation by means of centrifugal force FIG. 1571: a governor that uses centrifugal force and a lever to push a friction member against the edge of a disk fixed on a shaft FIG. 1572, FIG. 1574, FIG. 1575: governors that push the friction member of an oscillating pendulum against the inside circumference of a flange by means of centrifugal force FIG. 1581, FIG. 1583: governors that push a friction member in the direction of the axis of rotation by bending a spring or link by means of centrifugal force (1-2) Brake-type Governors that use Air Friction FIG. 1596, FIG. 1597: governors that produce air resistance by spinning fan blades FIG. 1598, FIG. 1599: governors that change the braking action by shifting the radial position of the fan blades or changing the blade angle FIG. 1601: governors that automatically and outwardly shift the fan blades (in a direction away from an axis) by means of centrifugal force FIG. 1603, FIG. 1604: governors that adjust by means of centrifugal force and wind pressure (1-3) Brake-type Governors that use Eddy Current FIG. 1606: governors that cause a conductive disk to rotate perpendicularly to the magnetic flux (2) Escapement Type Governors (2-1) Escapement Type Governors using Natural Vibration FIG. 1607, FIG. 1608: governors with a gravity pendulum or spring pendulum (2-2) Escapement Type Governors not using Natural Vibration FIG. 1613, FIG. 1616, FIG. 1617: governors that use the inertial moment of a pallet fork The following types of governors are used when the need for precision in the governor is relatively low.

In toys and other products for which sound output is acceptable, (1-1) brake-type governors that use solid friction and (2-2) escapement type governors that do not use natural vibration are used.

In small, inexpensive music boxes, (1-2) brake-type governors that use air friction are used, and (1-3) brake-type governors that use eddy current are used in electrical meters, for example.

In timepieces (mechanical timepieces) and other devices that require precision, (2-1) escapement type governors using natural vibration are used.

Examples of using the governors described above are also known from the literature, such as "Wristwatches of the World, No. 24" (World Photo Press K.K., Nov. 20, 1995 pp 69-73).

"Wristwatches of the World, No. 24" describes using (1-1) brake-type governors that use solid friction as the governor for the repeater (striker) mechanism of a timepiece and the sonnerie (striking mechanism).

A repeater strikes a gong or bell with a hammer to sound on demand when a button or slider is operated. A sonnerie strikes a gong or bell with a hammer to sound at a predetermined time (en passant), such as on the hour (0) and every quarter hour (15 minutes, 30 minutes, and 45 minutes). A dedicated spring is wound whenever the repeater is operated and at the predetermined timing of the sonnerie, but because the output torque of the spring varies according to the number of times the spring is wound, the interval at which the hammer strikes the gong varies according to the number of winds. The interval at which the gong is struck is shorter (faster) as the number of times the spring is wound increases (higher torque), and longer (slower) as the spring unwinds (torque decreases). The repeater or sonnerie indicates the time by the number of times the gong is struck, and the user may not be able to distinguish the strikes if the gong is struck too quickly, may miscount the strikes if the gong is struck too slowly, and may therefore not hear the correct time.

A governor such as described in (1-1) above is therefore used in repeater and sonnerie mechanisms in order to maintain a constant striking interval irrespective of how many times the spring is wound.

With the governor described in "Wristwatches of the World, No. 24," centrifugal force produced by rotation of the rotor when the mechanism starts causes the weight and lever to move to the outside in resistance to the force of the spring pulling to the inside. As the speed of the rotor increases, part of the weight or lever contacts the inside wall of the cylindrical case surrounding the rotor. When the speed of the rotor drops due to this contact, the centrifugal force also decreases, and the spring pulls the weight or wing towards the rotational axis of the rotor. The inertial moment of the rotor therefore decreases, rotor speed rises again, and centrifugal force again causes the weight or lever to move to the outside.

As this operation repeats, the rotor turns at a substantially constant speed although minute fluctuations are visible.

The reason that a governor consisting of a balance, hairspring, pallet fork, and escape wheel for a timepiece is not used as the governor in a repeater or sonnerie mechanism is that the escapement and governor is large in size (particularly the horizontal size) and therefore not space efficient, costly, and requires so much energy to drive the hammer that a spring with low torque cannot be used. In addition, the speed increasing ratio must be low and the period of the balance must be short (fast) due to the required interval at which the hammer strikes the gong. More particularly, if the speed of the balance is increased approximately 100 times, a short hairspring must be used, wear on the shaft and striking portions is severe, and using such a governor is therefore not practical.

DISCLOSURE OF INVENTION

Problem to be Solved by the Invention

Some of the problems with governors according to the related art as described above are described below.

Brake-type governors that use solid friction (1-1) as described in "Elements of precision devices II" depend on solid friction and therefore produce wear particles, noise, and heat, and thus have a short service life.

Brake-type governors that use air friction (1-2) require a large space.

Brake-type governors that use eddy current (1-3) suffer from the effects of flux leakage.

Escapement type governors that use natural vibration (2-1) use a swinging pendulum and cannot withstand changes in attitude, and therefore cannot be used in portable devices, and also produce a ticking sound. If a spring pendulum is used, high precision parts are required for the hairspring, balance, escape wheel, and pallet fork, thus increasing cost and requiring a large installation space while the escapement also produces a ticking sound.

In escapement type governors without natural vibration (2-2), noise and vibration from the escapement are great while wear shortens the service life.

The repeaters described in "Wristwatches of the World, No. 24" also continuously produce noise (the sound of contact) while the governor is operating because the weight and lever contact the inside wall of the cylindrical case surrounding the rotor. Repeaters such as described in "Wristwatches of the World, No. 24" enable the user to enjoy the sound of a gong struck by a hammer. The volume of the gong is typically too low for use in a portable timepiece because space is limited, requiring the timepiece to be held up to the ear in order to hear the go Furthermore, an echo effect inside the case cannot be expected in a wristwatch where space is particularly limited, and the sound of the gong relative to noise is low and the S/N ratio is poor when compared with a pocket watch. As a result, the quality of the sound is not high.

Wear also occurs as a result of the weight and lever striking the inside wall of the cylindrical case surrounding the rotor every time the gong sounds. This wear also spreads wear particles, which detract from the appearance and become a new source of wear when the wear particles adhere to the sliding parts of other mechanisms. An overhaul and adjustment therefore becomes necessary in a short period of time.

The friction coefficient also changes as a result of wear because of the change in the surface area of the contact parts and the surface condition. The friction coefficient also changes greatly even if oil or other type of lubrication is given to the contact parts in order to reduce wear because of change in the amount (due to evaporation and dissipation) and properties of the oil and contamination of the lubrication film surface. The set speed therefore gradually changes through repeated use, and the striking interval of the gong changes.

SUMMARY

An object of the present invention is therefore to provide a governor, and a power generating device and apparatus using the governor, that can be rendered compactly in a small space, can be used in devices that are driven with little power, do not produce wear particles or noise, are low cost, are not affected by differences in attitude, are not affected by magnetism, and afford excellent durability.

A governor according to a preferred aspect of the invention has a rotor that rotates using energy supplied from an energy storage means through a power transfer means; a wing having wing surfaces perpendicular to the rotational axis of the rotor, and disposed movably to an outside circumference side radially to the rotor by means of centrifugal force produced by rotor rotation; a wing returning means disposed between the rotor and wing for pulling the wing to the inside circumference side radially to the rotor; and an opposing object disposed to the outside circumference of the rotor and comprising an opposing surface located opposite and separated a predetermined gap from the wing surface when the wing moves to the outside circumference side radially to the rotor.

Thus arranged, energy from a spring or other energy storage means is transferred through wheels or other power transfer means to the rotor, and the rotor turns. When the rotor begins turning, the wing moves circularly together with the rotor and is subject to centrifugal force corresponding to the rotational velocity of the rotor. If this centrifugal force is less than the returning force of the wing returning means, the wing does not move to the outside. As the centrifugal force exceeds this returning force, the wing moves proportionally to the difference between the centrifugal force and the returning force in the direction away from the rotational axis of the rotor, that is, to the outside circumference side radially to the rotor.

When the wing moves to the outside circumference side radially to the rotor, the resistance of fluid viscosity corresponding to the amount of wing movement is applied to the wing. More specifically, when the rotor speed reaches a certain velocity, the wing that receives centrifugal force corresponding to the rotor speed overlaps the surface of the opposing object. If the distance between the wing surface and the opposing surface of the opposing object is set to a predetermined dimension that is less than the distance between the surrounding member and the wing surface, viscous resistance that is greater than the viscous resistance produced around the wing before the wing and opposing object surfaces overlap works between the wing and opposing object when the wing overlaps the surface of the opposing object. The viscous resistance therefore changes greatly at the speed at which the wing begins to overlap the opposing object. In other words, a cycle in which the rotor speed increases, wing movement increases, the wing and opposing object overlap and viscous resistance increases, the rotor speed drops, the wing is pulled back, the wing stops overlapping the opposing object, the viscous load drops, and rotor speed again increases repeats near the wing and opposing object boundary (the inside edge of the opposing object).

As a result, the rotor turns at a constant speed due to the continual change in the resistance acting on the wing according to the rotor speed. Wing movement can therefore be set to maintain a desired rotor speed by appropriately setting the energy output of the energy storage means, the centrifugal force (which is determined by, for example, the wing weight, the location of the center of gravity of the wing, and the acceleration rate) acting on the wing, the viscosity of the viscous fluid (which is normally air but may be a liquid) between the wing and opposing object, and the returning force of the wing returning means. As a result, the rotor can be driven at a constant speed without being affected by change in the remaining energy level within a particular range. If a spring is the energy source, for example, the rotor speed can be governed to a constant speed throughout the greater part of the spring winding range and until just before the spring torque changes suddenly.

When an actuator, a generator, or other device that receives power from an energy storage means is disposed in the power transfer path from the energy storage means to the rotor, or after the rotor, or in path separate from the power transfer path to the rotor, the governor keeps the rotor speed constant, or more particularly keeps the energy supply rate of the energy storage means (such as how fast the spring unwinds) constant. As a result, while the operating speed of the actuator or generator varies in the short term, the total number of revolutions during a predetermined period averages out and operation of the actuator or generator can be controlled to a constant speed.

The invention thus arranged affords the following effects.

The governor according to this aspect of the invention holds the operating speed of the actuator that is driven by the energy storage means constant by means of mechanical control instead of electronic control, therefore does not require a control circuit or sensor, and therefore reduces cost and occupies less space. Furthermore, because the governor is mechanical and does not require an electrical power supply, the governor can be used in products that do not have an electrical power source, including music boxes and mechanical timepieces having a repeater or striking mechanism. Furthermore, because the governor is mechanical and does not require an electrical power supply, using power produced by a generator-governor when used in an electronically controlled mechanical timepiece such as taught in Japanese Unexamined Patent Appl. Pub. H11-166980 is unnecessary, and shortening the operating time of an electronically controlled mechanical timepiece as a result of increasing power consumption can be prevented.

The governor of the invention is a contactless governor that utilizes the resistance of fluid viscosity, therefore does not produce wear particles, and eliminates soiling the mechanism and deterioration. The appearance is therefore not impaired by wear particles, periodic maintenance involving disassembling and cleaning to remove wear particles, replacing parts due to part wear, and adjustment is required less frequently, and the maintenance cost can therefore be reduced.

Furthermore, using a contactless governor that utilizes the resistance of fluid viscosity prevents noise. The absence of noise affords enjoying the clear, pure tone of the striking mechanism when the governor is used in product for enjoying sound, such as a music box or a timepiece with a repeater or sonnerie mechanism.

Because the rotor rotates in only one direction, the damage and deterioration of colliding parts (such as the escape wheel and pallet stone, and the impulse pin and fork) that is observed with a reciprocating swiss lever escapement can be prevented even if the rotor 200 turns at high speed.

The governor can also be rendered thinly and easily incorporated into a wristwatch or other portable device.

Furthermore, air can be used as the viscous fluid, and because a housing or structure for sealing the viscous fluid is not required when air is used, the governor can be easily rendered compactly and loss from the seal between the housing and axle can be prevented.

The viscous load acting on the wings can be increased by providing the opposing member with surfaces opposing the surfaces of the wings. The brake power per volume ratio can therefore be increased, and the governor and a device incorporating the governor can be made smaller. The speed increasing ratio of the speed increasing wheel train can therefore be reduced and the number of wheels in the wheel train can be reduced accordingly, thereby reducing the parts count, reducing cost, and improving space efficiency.

The amount that the wings fly to the outside varies according to the centrifugal force and therefore the rotor speed. Therefore, by providing a gap radially to the rotor between the opposing object and the wings when the wings are at rest, the viscous resistance acting on the rotor changes greatly at a certain speed (the speed at which the wings begin to overlap the surface of the opposing object). The wings therefore repeat small variations in movement near the boundary to the opposing object (the inside circumference edge). Rotor speed can therefore be set by controlling this gap in the radial direction in addition to the acceleration rate, number of speed-increasing stages, and the output torque of the energy source.

Preferably, the governor also has a gap adjustment means for adjusting the gap between the wing surface and the opposing surface of the opposing object.

The brake power of the fluid viscosity resistance can be adjusted by adjusting the size of the gap (the distance in the axial direction of the rotor) between the wing surface and the opposing surface of the opposing object, and the set speed of the rotor can therefore be easily adjusted and changed. As a result, the operating speed of the device can be easily adjusted to the set speed More specifically, the speed of the governor will not be as designed even if the specifications of the spring or other energy storage means (the torque characteristic of the spring) and the wheel train or other power transfer means (the speed increasing ratio) are the same due to individual differences in the components. By using the gap adjustment means to adjust the size of the gap, however, the governor can be tuned to the desired speed, and the operating speed of the device can be easily adjusted to the desired setting.

The gap can be adjusted in steps of a specific size or continuously.

The gap adjustment means can adjust the gap between opposing plates by inserting spacers of different thickness between the opposing plates. If the gap is adjusted by preparing spacers of various thicknesses and selectively inserting the appropriate spacer between the opposing plates, the cost can be reduced because the gap adjustment means can be rendered with a simple construction using only inexpensive parts.

Further preferably, the governor also has a horizontal distance adjustment means for adjusting the distance between the inside circumference edge of the opposing object and the center of rotor rotation.

The opposing object disposed to the outside of the rotor is substantially ring-shaped conforming to the outside circumference of the rotor. By adjusting the distance between the inside circumference edge of this opposing object and the center of rotor rotation, that is, the gap between the outside surface of the rotor and the inside circumference edge of the opposing object (the gap perpendicularly to the rotor axis, that is, horizontally to the rotor), the distance to where the wings overlap the surface of the opposing object, that is, the rotor speed, when the wings move to the outside due to the centrifugal force produced by rotor rotation can be set.

Similarly to when the gap adjustment means described above is used, the speed of the governor can therefore be tuned and the operating speed of the driven device can be adjusted to a desired setting by adjusting this gap using this horizontal distance adjustment means. Furthermore, by using both the gap adjustment means and this horizontal distance adjustment means, the adjustable range of the operating speed of the device can also be expanded and the governor of the invention can be used in a wider variety of devices.

This horizontal gap can also be adjusted in steps of a specific size or continuously.

The horizontal distance adjustment means can be rendered by separating the opposing object horizontally into two parts and adjusting the distance between the inside circumference edge of the opposing objects and the center of rotor rotation by using an eccentric pin, spring, screw, or other means to move the opposing objects closer together or farther apart. If this distance is adjusted by using such pins, springs, or screws, for example, the cost can be reduced because the adjustment means can be rendered with a simple construction using only inexpensive parts.

Yet further preferably, the gap between the wing surface and the opposing surface of the opposing object is 0.15 mm or less, and the viscous fluid intervening between the wing surface and the opposing surface is air.

If the gap between the wing surface and the opposing surface of the opposing object is 0.15 mm or less, sufficient brake power can be achieved using air as the viscous fluid, brake power can be changed greatly by changing the gap between the wing surface and the surface of the opposing object, and the set speed of the rotor can be easily controlled.

If air is the fluid, a housing for sealing and containing the fluid is unnecessary, and space efficiency can be improved. A seal structure for ensuring that the housing is sealed is also rendered unnecessary and low cost can therefore be achieved. There is also no loss from the sealing arrangement, and the range in which a constant speed can be held can be increased. Operating time is therefore increased accordingly, the force of the hammer spring can be increased, and a louder sound can be produced. Moreover, because a housing is not needed, the movement of the wings and rotor can be made visible and used as a selling point in music box and timepiece models enabling the user to see the internal mechanism.

Furthermore, because the viscous resistance can be changed greatly by changing the distance between the wing surface and opposing object slightly, a large space is not required for making adjustments, and the area around the rotor and opposing object can be rendered compactly.

The minimum distance between the wing surface and the opposing surface of the opposing object only needs to be great enough so that the wings and opposing object do not touch, and the actual dimension can be set according to the viscous resistance acting on the wings, or more particularly the set speed of the rotor. However, if the gap is excessively small, the wings and opposing plates could touch as a result of tilting caused by the rotor, the wings fluttering, or play between the tenons and jewels, and the adjustment required to prevent this contact is extremely difficult. Setting this gap to 0.03 mm or more therefore offers the advantage of easy adjustment.

Yet further preferably, the opposing object is disposed to oppose both sides of the wing in the direction of the rotational axis of the rotor.

The opposing object can be rendered using two opposing plates disposed on opposite sides of the wings, or as a single part having a channel into which the wings enter.

This arrangement applies the brake power produced by fluid viscosity resistance to both sides of the wings instead of just one side, and can therefore double the brake power while keeping the horizontal size of the rotor and opposing object of the governor the same. A governor with the same performance can therefore be rendered in a smaller package than a governor having the opposing surface of the opposing object on only one side of the wing.

When the opposing object is disposed to only one side of the wing, the distance between the wing and opposing object varies with displacement of the rotor resulting from change in the attitude of a timepiece or other portable device, the brake power therefore fluctuates and the rotor speed fluctuates, and the operating speed of the device therefore also varies.

By disposing the opposing object on both sides of the wing, however, the total change in viscous resistance is reduced if the wing is displaced closer to one opposing surface so that the distance to the other opposing surface increases because the distance to the one opposing surface decreases a corresponding amount. The governor speed therefore remains stable, and the operating speed of the device can be held substantially constant.

Further preferably, the governor also has an excessive wing movement prevention means disposed to the rotor for preventing the wing from flying outside of a predetermined position.

If the wings are of a type that move to the outside through rotation, the excessive wing movement prevention means can be any means of limiting the angle of rotation to a specific range, such as a pin or projection rendered to the rotor to limit further rotation of the wing by contacting the wing when the wing rotates a specific angle.

If the wings are of a type that move to the outside by sliding, the excessive wing movement prevention means can be any means of limiting movement beyond a predetermined range, such as a pin or projection rendered to the rotor to limit further movement by contacting the wings when the wings slide to a specific position.

If greater than expected torque is applied to the rotor or excessive force is applied to the wings due to impact when the timepiece is worn, for example, the wings will not fly beyond the preset position, and are thus prevented from contacting other parts.

Wear and damage to the wings, noise, and vibration can therefore be prevented. Furthermore, the excessive wing movement prevention means can be rendered by disposing a pin or projection to the rotor, and is therefore simple, lightweight, and inexpensive. If a pin that is used to attach the wing returning means or other member to the rotor is also used in the excessive wing movement prevention means, the excessive wing movement prevention means can be rendered using an even simpler and lower cost arrangement.

Yet further preferably, a plurality of wings are disposed to the rotor, and each of the wings is located at a weight-balanced position to the rotational axis of the rotor.

If two wings are disposed to a single rotor, for example, the wings are located at positions point symmetrical to the rotational axis of the rotor. If three wings are disposed to the rotor, the wings are disposed equidistantly at 120 degree intervals on a circle concentric to the rotational axis of the rotor.

By thus disposing a plurality of wings at positions maintaining the weight balance, the balance is maintained on the rotational axis even when viscous resistance acts on the wings, the rotor can therefore be prevented from tilting or twisting, and stable rotor rotation can be maintained.

Yet further preferably, a part of the outside profile of the wing is shaped to overlap a circle that is concentric to the rotational axis of the rotor when the wing is located at the maximum outside position.

Compared with wings having a different outside profile, the wing profile of the invention maximizes the overlapping surface area of the wings and opposing object when the wings are spread to the maximum diameter, and brake power can be increased because the area near the outside part of the wings is increased when the peripheral velocity is greatest. Brake power can therefore be increased relative to the size of the governor, and a governor affording sufficient brake power in a small space can be provided.

Yet further preferably, the inside edge profile of the opposing object is a circle concentric to the rotational axis of the rotor, and a part of the outside profile of the wing is the same shape as the inside edge profile of the opposing object.

Because the outside profile of the wing is the same shape as the inside edge profile of the opposing object, the viscous resistance acting on the opposing object and wings can be increased when centrifugal force drives the wings to the outside and the outside edge of the wings starts to overlap the inside edge of the opposing object. The difference in the force of viscous resistance can therefore be increased before and after the wings and opposing object overlap. The rotor speed can therefore be more reliably stabilized at the set speed.

Further preferably, the wing returning means is a flat zigzag spring.

The governor of the invention is used in small devices such as wristwatches, and requires a large wing area in order to use a small rotor while assuring sufficient brake power. The wing returning means therefore preferably occupies little space at the natural length while affording great deflection.

When a leaf spring is used as the wing returning means, the critical stress exceeds the allowable stress when the required deflection and spring force are achieved. Using a coil spring requires more space, particularly vertical space, and incorporating a coil spring in a thin device such as a wristwatch is therefore difficult.

If a flat zigzag spring is used, however, both sufficient deflection and urging force can be achieved using the same material used in a leaf spring, and the critical stress does not exceed the allowable stress. Spring thinness and deflection can also be balanced, and a thin rotor and governor can be achieved. A thin device can therefore be provided even if the spring is disposed above or below the wings, and greater freedom is achieved in the horizontal layout. The wing and spring can therefore be rendered in unison, and the parts cost and assembly cost can be reduced.

This flat zigzag spring is preferably made by electroforging.

Zigzag springs can be made by different processes, including press, wire arc discharge, electroforging, etching, photoresist, or transfer electroplating.

The problem with press processes is that a die is required and the initial cost is high. Small lots of many different products can be manufactured by simply changing a software program with wire arc discharge methods, but the processed surface is rough, stress concentration occurs, and the appearance is poor. Etching processes do not have the rough surface left by wire arc discharge methods, afford a nice appearance, and do not suffer from breaks due to stress concentration, but are constrained by the width and thickness ratio of the material and cannot produce a precisely square section.

Electroforging affords good surface roughness like etching, as well as greater freedom in the width and thickness ratio of the material. Unlike etching, electroforging affords a nearly square section, and easier simulation of the spring design. Furthermore, once a mask is produced the mask can be used repeatedly, and multiple springs can be manufactured from a single mask.

Yet further preferably, a plurality of wings are disposed to the rotor, and the wing returning means is an integral arrangement having a zigzag spring disposed for each of the plural wings.

If there are two wings, the wing returning means is a single flat spring having two zigzag spring parts each having one end connected to one wing, and a spring positioning part to which the other end of each zigzag spring part is connected. A hole to which the rotor pinion is inserted is rendered in the center of the spring positioning part, and holes corresponding to projections or pins rendered on the rotor are formed on opposite sides of the rotor hole in the spring positioning part. These holes are then fit over the rotor pinion and projections to prevent the wing returning means from rotating horizontally and position the wing returning means.

By thus disposing a zigzag spring part to each of the plural wings, the spring can be positioned with greater freedom. Furthermore, because the plural spring portions and the spring positioning part are rendered in unison, only a single positioning part is required, the overall size can be reduced, the spring can be manufactured with fewer steps, and assembly and handling are easier.

Furthermore, because a hole to which the rotor pinion is inserted can be rendered in the center of the spring positioning part, positioning is easier when engaging the spring with the wings during assembly, and assembly is thus easier.

In another aspect of the invention the wing is substantially crescent shaped and axially supported by an axle to rotate freely to the rotor, and the axle is rendered toward one end portion from the center of gravity of the wing.

Thus comprised, centrifugal force from rotation of the rotor causes the wings to rotate on the axles to the outside (to the outside radially to the rotor).

Compared with wings that move parallel to a radius of the rotor, friction resistance from the wing support structure is less because the wings pivot on an axis of rotation, the wings move smoothly, and the rotational velocity of the governor is stable. More particularly, if the axis of rotation is a ring made from a jewel (such as a ruby used in a timepiece and having a center hole) and the axle is a shaft made of hardened steel (such as the tenon of a wheel train in a timepiece), smooth rotation and wear resistance can be achieved at low cost.

If the wings move parallel to a rotor radius, the wings can become biased and twist due to rotor rotation, cannot move smoothly, and thus wear. A slider and guide mechanism is also required, and the size of this mechanism inhibits reducing the size of the governor. Other problems include weight, the rotational load of the rotational axis of the rotor, wear, and shock when the governor is dropped.

Further preferably, the wing returning means contacts the wing at a point offset to the axis of rotation from the center of gravity of the wing.

If the wing returning means is a zigzag spring, the position where the zigzag spring is attached to the wing is offset toward the axis of rotation from the center of gravity of the wing.

Thus comprised, spring displacement when the wings pivot can be reduced compared with an arrangement in which the spring connection is separated farther from the axis of rotation than the center of gravity of the wing. The spring is therefore easier to set, and the spring expands and contracts smoothly. Furthermore, because spring displacement in the direction of rotation can be reduced, there is less twisting of the zigzag spring, and the spring expands and contracts easily. Furthermore, when the spring and wings are rendered in unison, it is more difficult for stress to concentrate where the wing and spring connect. In addition, when the ring or C-shaped end of the spring is hooked on a pin planted in the wing, there is little sliding between the spring and pin, and there is no worry about wear.

A generator according to another aspect of the invention has the governor described in any of claims 1 to 13 of the invention, an energy storage means for storing mechanical energy; a power transfer means for transferring mechanical energy from the energy storage means to the governor; and a generator that is driven by the mechanical energy supplied from the energy storage means.

This generator can be a common generator having a rotor with a two-pole magnet, a stator disposed around the rotor, and a coil wound to the stator. The generator can be driven by a power transfer means disposed between the energy storage means and governor, or the generator can be driven by a power transfer means that transfers power from the governor. Further alternatively, a power transfer means that branches from the first power transfer means, or transfer mechanical energy from an energy storage means separate from the energy storage means connected to the first power transfer means, can be used to drive the generator.

Power output from this generator is stable because the governor keeps the generator rotating at a constant speed. Because power output is stable and a large capacitance capacitor is not needed, a performance drop caused by a drop in capacitor capacitance from repeated charging and discharging is prevented.

Furthermore, because the control circuit that is needed when generator speed is governed by applying a solenoid brake is not required, electronic components such as IC devices and a quartz oscillator are unnecessary, and an inexpensive generator system can be provided. Furthermore, because the control circuit is unnecessary and none of the generated power needs to be supplied to the control circuit and other electronic components, energy efficiency is improved. The operating time of the generator is therefore longer and generator size can be reduced.

An apparatus according to another aspect of the invention has the governor according to the invention and an operating unit that is governed by the governor.

This apparatus could have the governor of the invention and a generator that is governed by the governor.

Examples of such apparatus include toys; music boxes; simple timers; electronically controlled mechanical timepieces; timepieces having at least one of a group of devices including an alarm, a repeater, a striking mechanism, and an automaton; mechanical chimes; mechanical cameras (a timer mechanism); an automaton or automata; radios; and flashlights.

More particularly, the apparatus of the invention is an electronically controlled mechanical timepiece having a mechanical energy source; a generator that is driven by the mechanical energy source to produce induced power and supply electrical energy; a rotation control device that is driven by electrical energy and controls the speed of generator rotation, and a time display device that operates in conjunction with generator rotation; a repeater or sonnerie mechanism; an energy storage means for operating the repeater or sonnerie mechanism; and a power transfer means for supplying energy from the energy storage means to the governor.

The mechanical energy source and energy storage means are both a barrel wheel with an internal hairspring.

The governor of the invention and a generator incorporating this governor operate with solely mechanical power, do not require an electrical power supply, and can therefore be used in music boxes and mechanical timepieces having a repeater or sonnerie mechanism, mechanical cameras with an automatic shutter release mechanism, and other products that do not have an electrical power supply.

When used in an electronically controlled mechanical timepiece, shortening the operating time of the electronically controlled mechanical timepiece can be prevented because governing the generator does not use any of the generated power. Furthermore, because the governor produces no noise, when the governor is used in an electronically controlled mechanical timepiece as a governor for a repeater or sonnerie mechanism, the sound of the sound source can be heard more clearly because there is no noise from the escapement as there is in a mechanical timepiece. The governor can also be used in emergency radios, flashlights, and other emergency devices because there is no loss of performance over time.

When a sonnerie mechanism is assembled in an electronically controlled mechanical timepiece, separate barrel wheels can be provided (as a mechanical energy source) to drive the hands and (as an energy storage means) for the sonnerie mechanism, or a single barrel wheel can be used. For example, rotation of the barrel wheel connected to one end of the spring could be used to drive the hands, and the ratchet wheel that is connected to the other end of the spring and rotates in the opposite direction as the barrel wheel can be supplied to the governor and used for speed control. The operating time is shortened slightly in this case, but a smaller, thinner timepiece can be provided because a spring and barrel wheel can be eliminated.

Effect of the Invention

The present invention therefore provides a governor, and a power generating device and apparatus using the governor, that can be rendered compactly in a small space, can be used in devices that are driven with little power, do not produce wear particles or noise, are low cost, are not affected by differences in attitude, are not affected by magnetism, and afford excellent durability.

DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A first embodiment of the present invention is described next.

Figure 1:
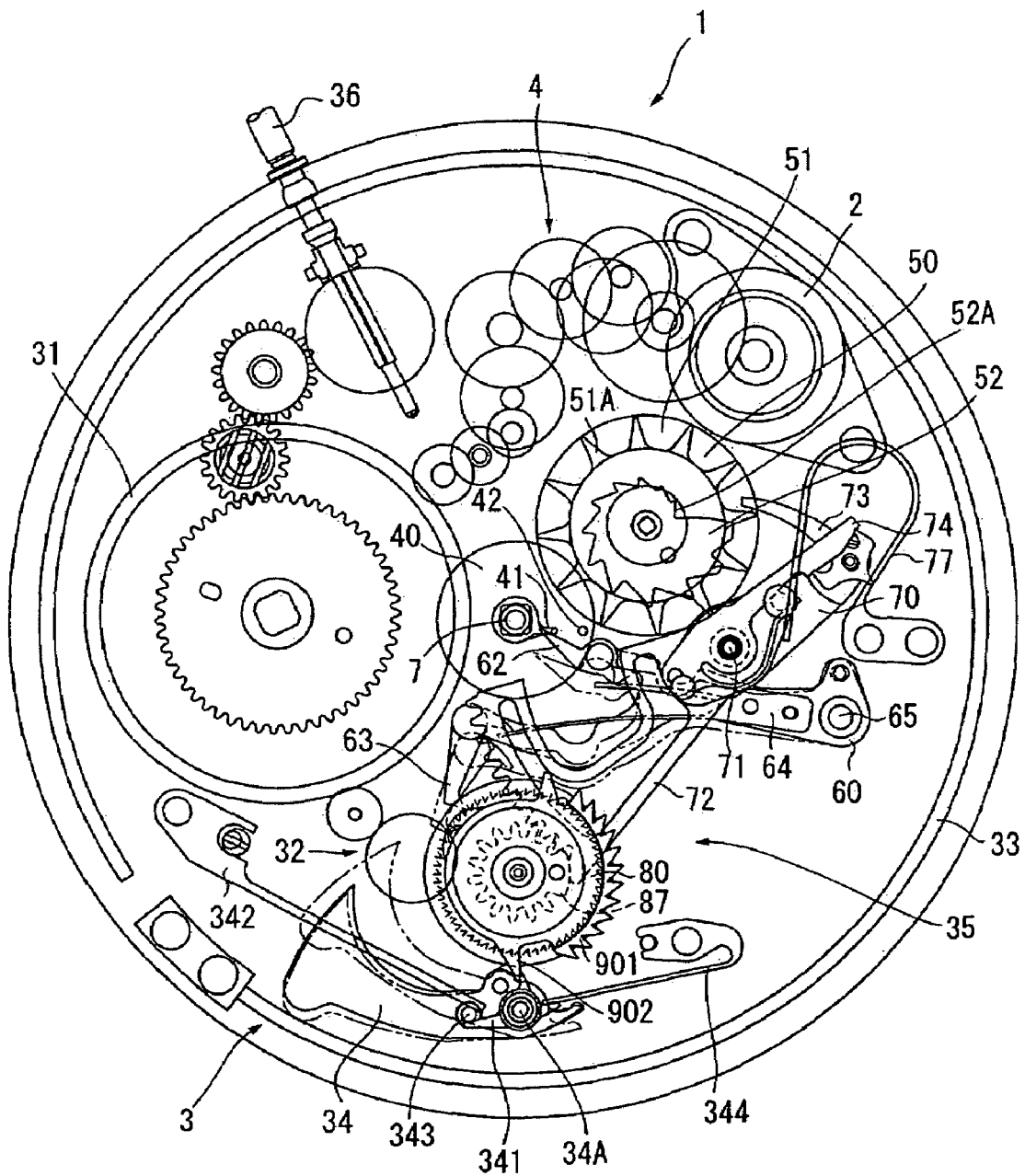
FIG. 1 is a plan view of a sonnerie mechanism in an electronically controlled mechanical timepiece according to a first embodiment of the invention.

FIG. 1 is a plan view of a timepiece 1, with a display showing time information, according to this first embodiment of the invention. The timepiece 1 has a sonnerie mechanism (operating unit) 3 rendered on the dial side of the base timepiece, and the governor 2 according to the invention is used to operate the sonnerie mechanism.

The movement for driving the hands of the timepiece 1 could be a movement for a mechanical timepiece, an analog quartz timepiece, or an electronically controlled mechanical timepiece. The sound of the sonnerie mechanism is made difficult to hear by the ticking sound produced by the governor having a balance, hairspring, pallet fork, and escape wheel in a mechanical timepiece, however, and by the sound of magnetostriction and gear teeth striking in an analog quartz timepiece. An electronically controlled mechanical timepiece, which produces less noise, is therefore preferably used.

Arrangement of the Governor

The arrangement of the governor 2 is described next.

Figure 2A:
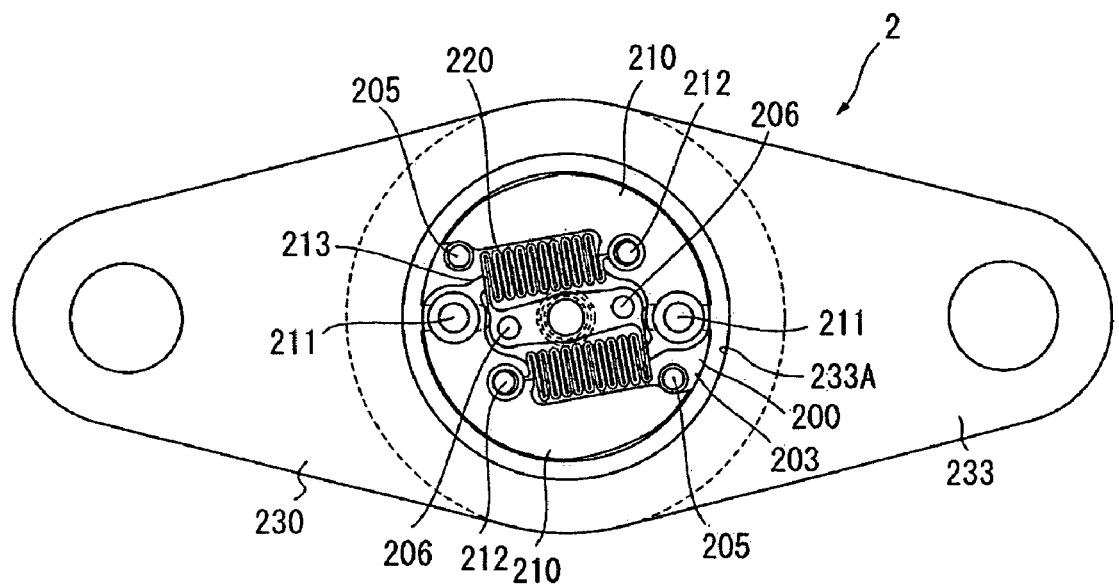
FIG. 2 is a plan view of the governor in the first embodiment.
Figure 2B:
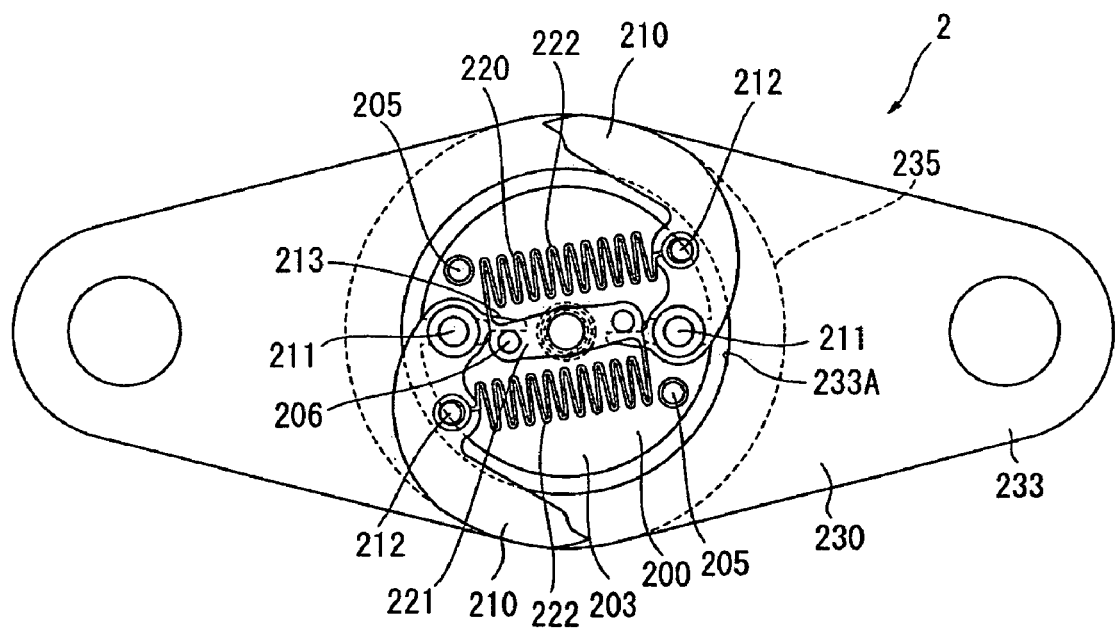
Figure 3:
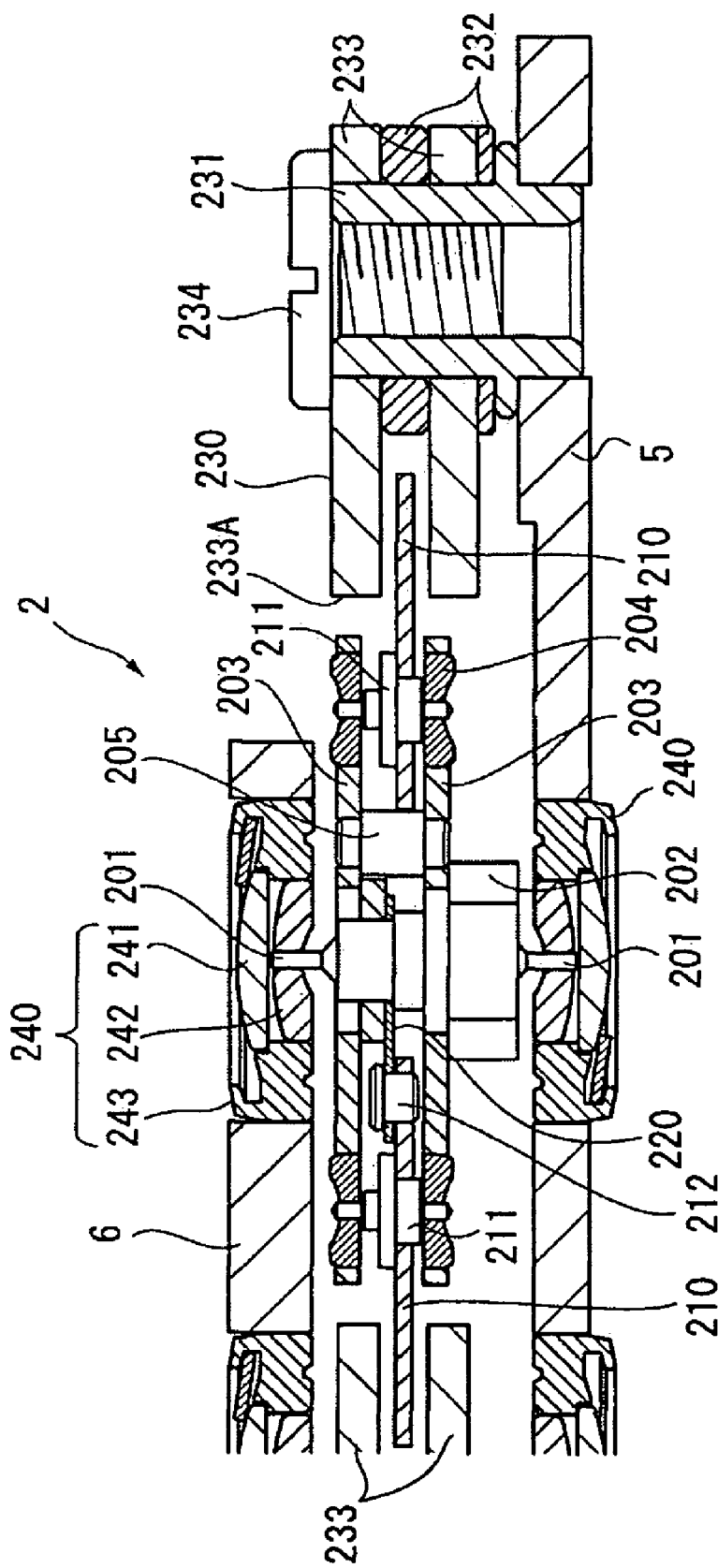
FIG. 3 is a section view of the governor in the first embodiment.

As shown in FIG. 2A, FIG. 2B, and FIG. 3, the governor 2 includes a rotor 200, two wings 210, a zigzag spring 220 that is a wing returning means, and opposing member 230.

The rotor 200 is located freely rotatably between the plate 5 and the train wheel bridge 6. More specifically, top and bottom tenon 201 parts of the rotor 200 are received by bearing units 240 assembled in the train wheel bridge 6 and plate 5. The bearing units 240 include jewels 241 and 242 made of ruby, for example, in the center, and a brass jewel guide 243 for guiding the jewels.

The rotor 200 has a rotor pinion 202 to which the tenons 201 are formed, and a wing guide plate 203 affixed to the rotor pinion 202.

The rotor pinion 202 is a small wheel made of hardened steel. The rotor pinion 202 meshes with a wheel in the drive power transfer wheel train 4, which is the power transfer means. The drive power transfer wheel train 4 is a speed-increasing wheel train, and engages the barrel wheel 31 having an internal spring. The rotor 200 is turned by mechanical energy transferred from the barrel wheel 31 through the drive power transfer wheel train 4.

A pair of wing guide plates 203 are affixed with a specific gap therebetween to a part of the rotor pinion 202. The wing guide plate 203 disposed proximally to the rotor pinion 202 is press fit and secured to a part of the rotor pinion 202, and the other wing guide plate 203 is attached to the rotor pinion 202 by means of the press-fit wing guide plate 203 and a wing locking stud 205. The wing guide plates 203 are thin plates of stainless steel or brass, and are circular in plan view.

Wing stud jewels 204 made of ruby or other hard stone are press fit into the wing guide plates 203, and the ends of the steel wing locking stud 205 and steel spring catch stud 206 are press fit into both wing guide plates 203. The wing stud jewels 204 are located point symmetrically to the rotor pinion 202.

The axles of the steel wing pins 211, which are press fit to the wings 210, are inserted to the wing stud jewels 204. The wing stud jewels 204 are appropriately lubricated so that the wing pin 211 can rotate smoothly.

A zigzag spring 220 is attached to spring catch studs 206.

The zigzag spring 220 is formed by shaping thin stainless steel plate, and includes a spring positioning part 221 disposed in the middle and zigzag spring parts 222 formed in a zigzag extending from the opposite ends of the spring positioning part 221.

The zigzag spring 220 is attached to the wing guide plates 203 so as to not rotate by fitting the two holes formed in the spring positioning part 221 over the spring catch studs 206. The rotor pinion 202 passes through the hole in the center of the spring positioning part 221.

The wings 210 are thin stainless steel pieces that are substantially crescent shaped in plan view, and are disposed rotatably on wing pins 211. A steel wing spring catch pin 212 is press fit to each wing 210 between the wing pin 211 and the distal end of the wing 210 at a position offset towards the wing pin 211 from the center of gravity of the wing 210. A ring part rendered at the distal end of the zigzag spring part 222 of the zigzag spring 220 is caught on the wing spring catch pin 212. A flange is formed on the distal end of the wing spring catch pin 212 to prevent the zigzag spring 220 from slipping off. The zigzag spring 220 thus pulls the distal end of the wings 210 towards the rotational axis (rotor pinion 202) of the rotor 200.

When the rotor 200 is stopped, the force of the zigzag spring 220 pulls the wings 210 towards the center of the rotor 200 so that the distal ends of the wings 210 are against the wing locking studs 205.

When the rotor 200 turns, centrifugal force corresponding to the speed of rotation causes the wings 210 to rotate around the wing pin 211 against the zigzag spring 220 and move to the outside (to the outside circumference side radially to the rotor 200) as shown in FIG. 2B.

A finger 213 is rendered to each wing 210 near the wing pin 211, and movement of the wings 210 to the outside is limited to the position (angle) where this finger 213 contacts the spring catch stud 206. The finger 213 and spring catch stud 206 render an excessive wing movement prevention means in this embodiment of the invention.

When the rotor 200 speed decreases, the centrifugal force acting on the wings 210 also drops according to the decrease in rotational speed, and the zigzag spring 220 therefore pulls the wings 210 a corresponding amount back towards the rotor 200.

The wings 210 are axially supported by the wing stud jewels 204 disposed point symmetrically to the rotor pinion 202, and are thus attached at a position balanced to the rotor 200.

The opposing member 230 has a cylindrical support member 231 that is press fit and fastened to the plate 5, two opposing plates 233 disposed to the flange of the support member 231 with intervening spacers 232, and a set screw 234 that screws into the support member 231 and holds the opposing plates 233 between the screw 234 and the support member 231.

The distance between the opposing plates 233 is determined by the thickness of the spacer 232 between the opposing plates 233. Spacers 232 of various thicknesses are prepared in this embodiment of the invention, and the distance between the opposing plates 233 can be set appropriately during manufacture or later by selectively inserting the right spacer 232.

The rotor 200 is disposed inside an opening 233A formed in the opposing plates 233. This opening 233A in the opposing plate 233 is concentric to the axle of the rotor 200.

When the wings 210 move to the outside due to centrifugal force, the wings 210 are located in the gap between the opposing plates 233. The wings 210 are disposed substantially in the center of the gap between the opposing plates 233, and the gap between the wings 210 and each of the opposing plates 233 is substantially equal.

The wings 210 in this embodiment of the invention are shaped as shown in FIG. 2A so that when the distal ends contact the wing locking stud 205 the outside edge of the wings 210 is inside the outside circumference of the wing guide plate 203 and the outside edges of the wings 210 do not protrude from the wing guide plate 203.

The wings 210 are also shaped so that when centrifugal force causes the wings 210 to swing out to the maximum outside position where the fingers 213 on the wings 210 contact the spring catch studs 206, part of the outside profile of the wing 210 is concentric to the opening 233A. More specifically, the wings 210 are shaped so that part of the outside edge of the wings 210 is superimposed on an imaginary line 235 concentric to the opening 233A as shown in FIG. 2B.

Governor Operation

A governor 2 arranged as described above operates as follows to control the speed.

When the rotor 200 is turned by means of the intervening drive power transfer wheel train 4, centrifugal force acts on the wings 210 and causes the wings 210 to fly to the outside of the wing guide plate 203 and enter the space between the opposing plates 233. Because of the small gap between surfaces of the wings 210 and the opposing surfaces of the opposing plates 233, the wings 210 are subject to greater resistance due to air viscosity than before entering the gap between the opposing plates 233. This resistance due to air viscosity causes the speed of the rotor 200 to drop and the centrifugal force to decrease so that the wings 210 which had flown to the outside of the wing guide plate 203 are pulled back towards the rotor 200 by the zigzag spring 220.

When the rotor 200 speed drops and the wings 210 are pulled back to the wing guide plate 203 from between the opposing plates 233, the resistance of the air viscosity working on the wings 210 decreases, the rotor 200 therefore accelerates again, and the wings 210 again fly outside of the wing guide plate 203 and enter the gap between the opposing plates 233 [wing guide plate 203, sic]. As this behavior repeats, the rotor 200 is held at a substantially constant speed.

The speed of the rotor is also affected by variation in the meshing efficiency of the gears in the drive power transfer wheel train 4 and variation in the operation of the device driven by the rotor (the sonnerie mechanism in this embodiment of the invention). In any case, however, centrifugal force corresponding to the rotor speed acts on the wings 210, the distance the wings fly out varies according to the speed, and the speed of the rotor 200, that is, the operating speed of the device being driven, is held substantially constant.

Sonnerie Mechanism

The sonnerie mechanism 3, the operating speed of which is governed by the governor 2 of this embodiment of the invention, is described next.

The basic arrangement of a sonnerie mechanism is known from the literature, and the description of the sonnerie mechanism is therefore omitted or simplified below.

The arrangement of a sonnerie mechanism according to the related art is described, for example, in "A Guide to Complicated Watches" by Francois Lecoultre, pages 159 to 179.

The sonnerie mechanism 3 is located on the dial side of the movement in the timepiece 1, and as shown in FIG. 1 includes a barrel wheel 31 with an internal spring that is the energy storage means of the sonnerie mechanism, the drive power transfer wheel train 4 as a speed-increasing wheel train conveying torque from the barrel wheel 31 to the governor 2, a gong 33 for producing sound, a hammer 34 for striking the gong 33, and a striking control means 35 for causing the hammer 34 to operate and strike the gong 33 a number of times corresponding to the time.

The barrel wheel 31 is provided specifically for the sonnerie mechanism and is separate from the barrel wheel that is used to drive the hands of the timepiece 1, and is rendered so that the internal spring can be tightened by turning the crown 36 with the stem at step 0.

The gong 33 is a C-ring made from hardened steel disposed around the outside circumference of the sonnerie mechanism 3 (the outside circumference of the movement of the timepiece) with one end of the gong 33 fastened to the plate 5.

The hammer 34 is also made of hardened steel and is disposed to strike the base end of the gong 33. The hammer 34 is operated by a hammer trip 341 that is disposed to pivot freely on the hammer 34 support pin 34A, and a hammer spring 342 that urges the hammer 34 toward the gong 33. More specifically, the hammer spring 342 contacts the spring pin 343 of the hammer 34 and urges the hammer 34 to pivot counterclockwise as seen in FIG. 1 around the support pin 34A. The hammer trip 341 also contacts the spring pin 343. When the sonnerie mechanism 3 is not operating, the hammer trip 341 is held in the position shown in FIG. 1 by a pawl 902 described further below so that the hammer 34 is also at rest at a position separated from the gong 33. The hammer trip 341 is urged in the clockwise direction as seen in FIG. 1 by a hammer trip spring 344.

The striking control means 35 includes a screw nut 40, a snail wheel 50, a release lever 60, an hour repeating rack 70, and a center wheel 80.

The hour repeating rack 70 and center wheel 80 are the parts of this sonnerie mechanism that feature improvements over the sonnerie mechanism of the related art and are therefore described in detail below. Other parts of the sonnerie mechanism are known from the literature, and further description thereof is omitted below.

The screw nut 40 rotates in unison with the cannon pinion 7 that drives the hands, and drives the release lever 60 by means of a stud 41.

More specifically, a chamferred portion is formed on the outside of the cannon pinion 7, and a screw nut 40 with a center ratchet hole is inserted from the dial side. The screw nut 40 therefore turns in unison with the cannon pinion 7 (second wheel=minute hand).

The stud 41 on the outside part of the screw nut 40 contacts the release lever 60 slightly before the base movement indicates the hour (the minute hand points to twelve), and rotates the release lever 60 counterclockwise as seen in FIG. 1.

A pin 42 also protrudes from the disk portion of the screw nut 40.

The snail wheel 50 includes a star wheel 51 with twelve teeth 51A, and a snail plate 52 with twelve faces 52A each with a sequentially different length from the axis of rotation. If L1 is the length from the center of rotation of the face that is nearest the axis of rotation, L2 is the length from the center of rotation of the face that is next closest to the axis of rotation, and $\Delta L$ is the difference between L1 and L2, then length $L2=L1+\Delta L$, and the length L3 of the third shortest face from the center of rotation is $L3=L1+2\times\Delta L$.

In other words, if the length of each face 52A is sequentially denoted L1 to L12 from shortest to longest, length $Ln=L1+(n-1)\times\Delta L$ (where n ranges from 1 to 12), and the length of each face 52A is set to the length sequentially incremented for each $\Delta L$.

The snail wheel 50 rotates 1/12 revolution per hour as a result of the pin 42 on the screw nut 40 engaging the teeth 51A of the star wheel 51.

Figure 4:
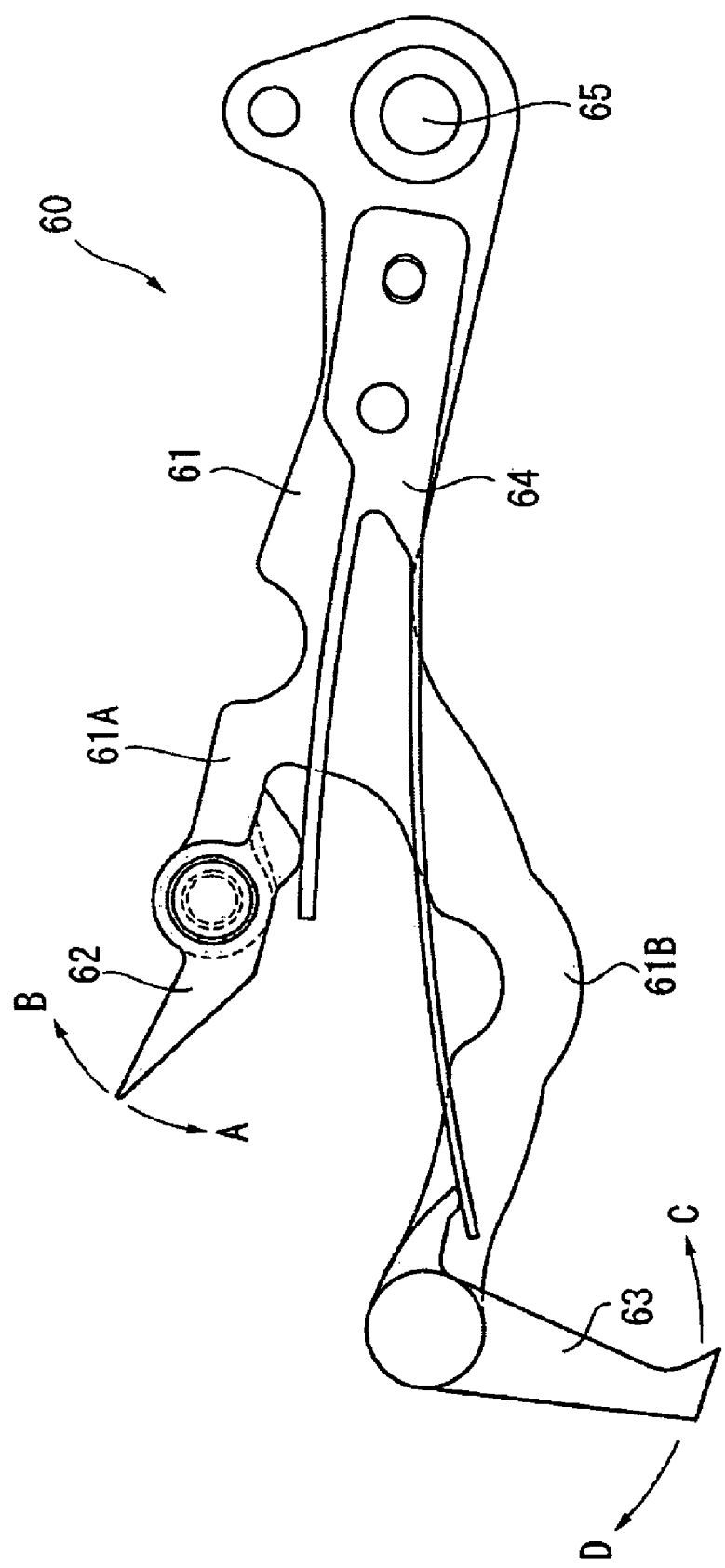
FIG. 4 is a plan view of the release lever of the sonnerie mechanism.

As shown in FIG. 4, the release lever 60 includes a substantially Y-shaped main lever 61, a beak 62 affixed to the distal end of one arm 61A of the main lever 61, a release lever click 63 affixed to the distal end of the other arm 61B of the main lever 61, and a release lever spring 64 that is engaged by the release lever click 63.

The release lever 60 is disposed freely rotatably to the plate 5 by means of an axle 65, and is rotated counterclockwise as seen in FIG. 1 in conjunction with rotation of the screw nut 40.

The beak 62 is attached freely rotatably to the main lever 61, and is urged to rotate counterclockwise (in the direction of arrow A) as seen in FIG. 4 by the release lever spring 64. This rotation is limited to the position where the beak 62 contacts the main lever 61 as shown in FIG. 4.

When force causing the beak 62 to rotate clockwise (in the direction of arrow B) in FIG. 4 is applied, such as by turning the crown 36 to move the minute hand counterclockwise, the beak 62 turns in the direction of arrow B and is then returned to the original position by the urging force of the release lever spring 64. This prevents damage to the beak 62 and the release lever 60.

The release lever click 63 is urged to rotate counterclockwise (in the direction of arrow C) in FIG. 4 by the release lever spring 64, and engages the triangular teeth 821 of the release ratchet 82 of the center wheel 80 as further described below.

When the release lever 60 turns counterclockwise, the release lever click 63 pushes the triangular teeth 821 of the release ratchet 82 and causes the release ratchet 82 to rotate counterclockwise.

The hour repeating rack 70 (HRR) converts the current time denoted by the snail wheel 50 to the strokes corresponding to the number of times the gong 33 is struck, and stops the barrel wheel 31 when the sonnerie mechanism 3 is stopped.

Figure 5:
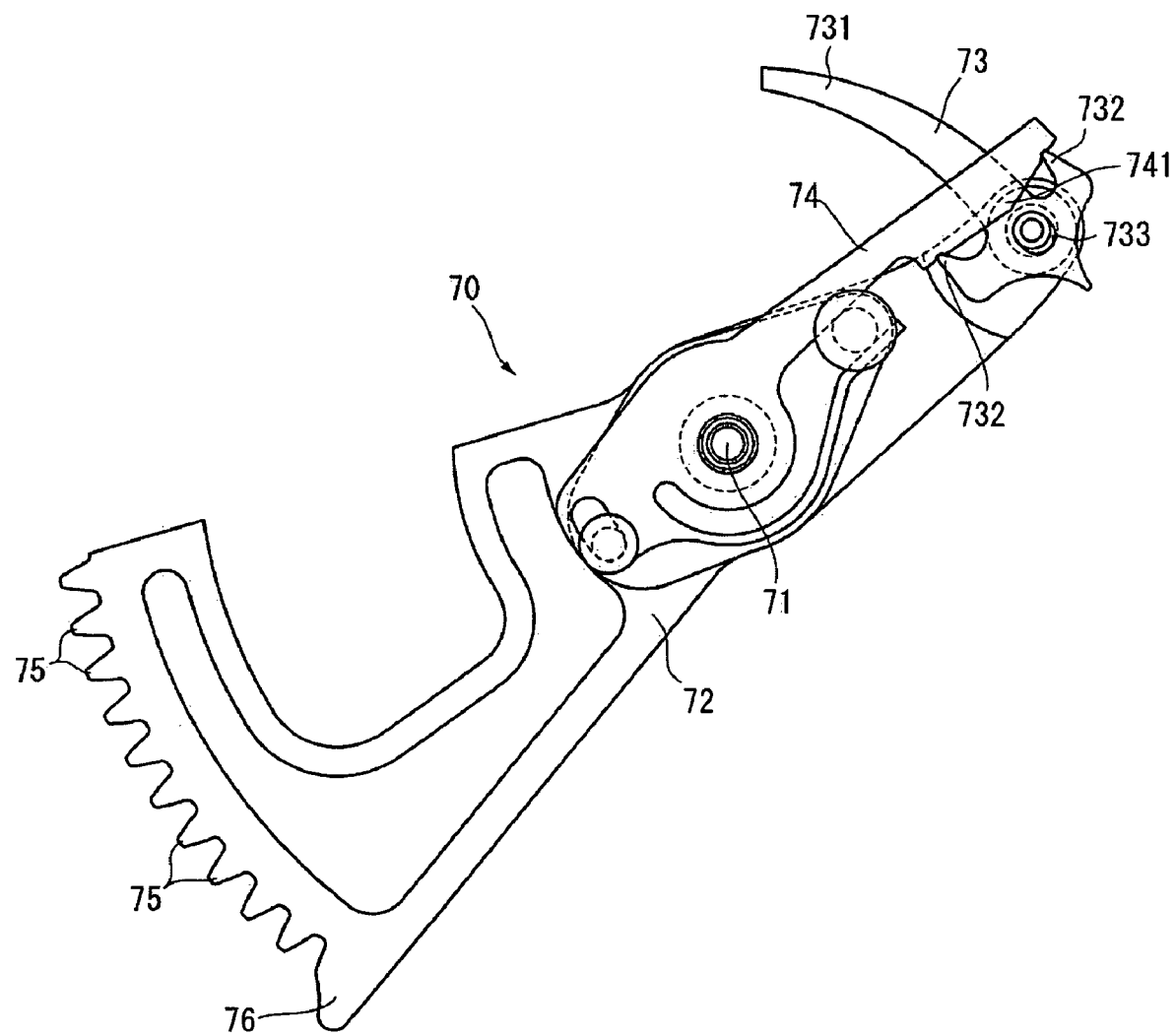
FIG. 5 is a plan view of the hour repeating rack in the sonnerie mechanism.

As shown in FIG. 5, the hour repeating rack 70 has an axle 71 supported freely rotatably between the plate 5 and train wheel bridge 6, a main rack 72 that is press fit to the axle 71, an hour repeating rack click 73 attached freely rotatably to the main rack 72, and an hour repeating rack click spring 74 that is guided by the axle 71 and urges the hour repeating rack click 73.

The main rack 72 has teeth 75 arranged in an arc centered on the axle 71. A stop 76 disposed at an end of this arc portion contacts and limits rotation of the center wheel 80 as further described below.

The hour repeating rack click 73 has a basically T-shaped terminal part 731 (time-reading terminal) for touching the faces 52A of the snail wheel 50, and two engaging parts 732 for engaging the hour repeating rack click spring 74. The hour repeating rack click 73 is affixed freely rotatably to the main rack 72 by fitting an oblong hole 733 (tracking hole) formed in the hour repeating rack click 73 onto a pin press fit in the main rack 72.

Figure 6:
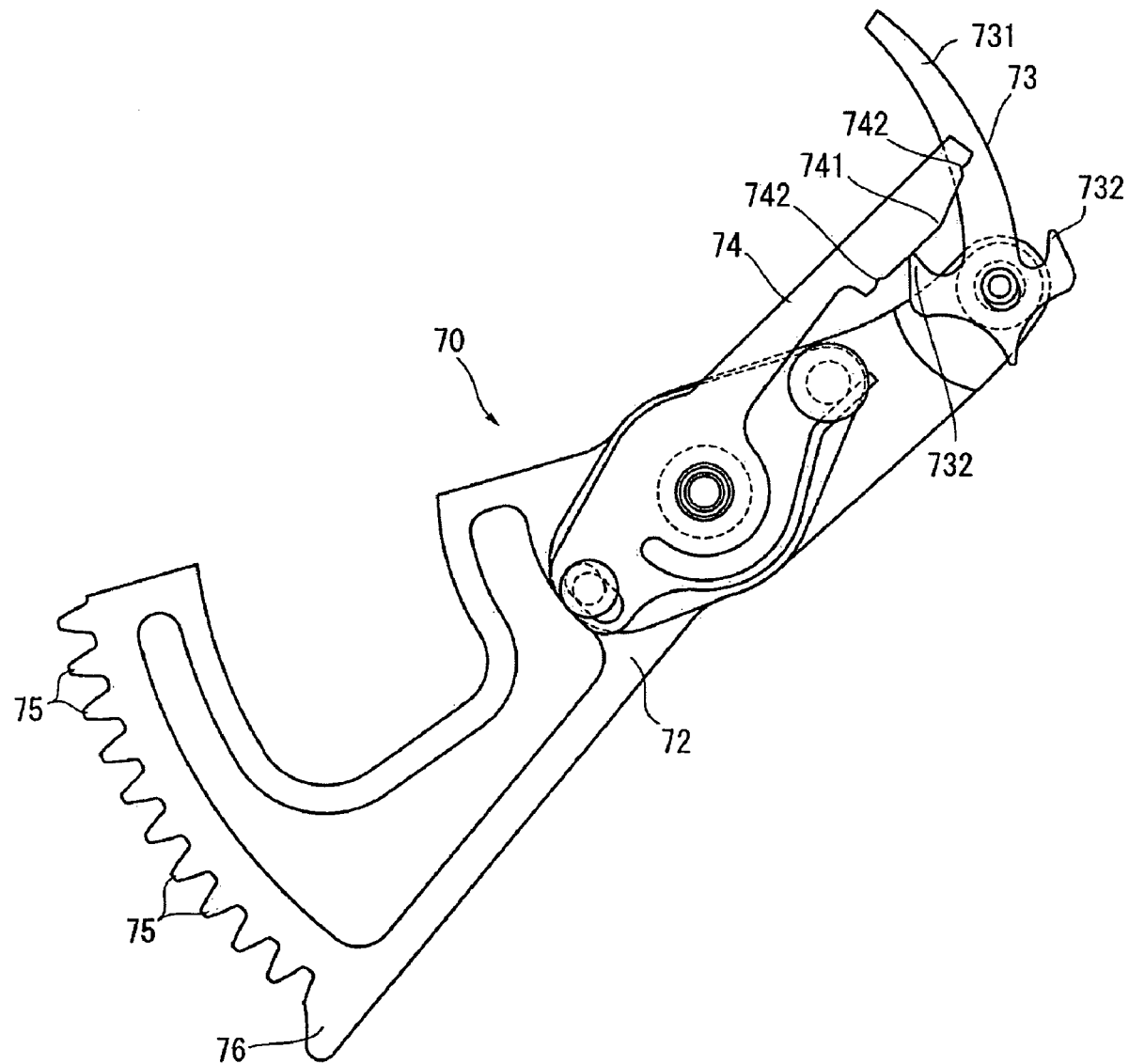
FIG. 6 is a plan view showing rotation of the hour repeating rack click in the hour repeating rack of the sonnerie mechanism.

As shown in FIG. 6, the hour repeating rack click spring 74 is a spring with a triangular tooth 741, and small notches 742 formed at two locations on the sloped sides of this triangular tooth 741. When the engaging parts 732 fit into these notches 742, the hour repeating rack click 73 is in the resting position.

When the hour repeating rack click 73 is in contact with a face 52A on the snail wheel 50 and the hands are adjusted, causing the snail wheel 50 to turn and the snail plate 52 to contact the side of the hour repeating rack click 73, the engaging parts 732 separate from the notches 742 and the hour repeating rack click 73 can turn so that the hour repeating rack click 73 is not damaged.

When contact between the snail wheel 50 and the hour repeating rack click 73 is released, the engaging parts 732 are guided by the slopes of the triangular tooth 741 and the hour repeating rack click 73 is automatically returned to the resting position with the engaging parts 732 fit in the notches 742.

An hour repeating rack spring 77 fixed on the plate 5 urges the hour repeating rack 70 to move counterclockwise as seen in FIG. 1 on the axle 71.

Figure 7:
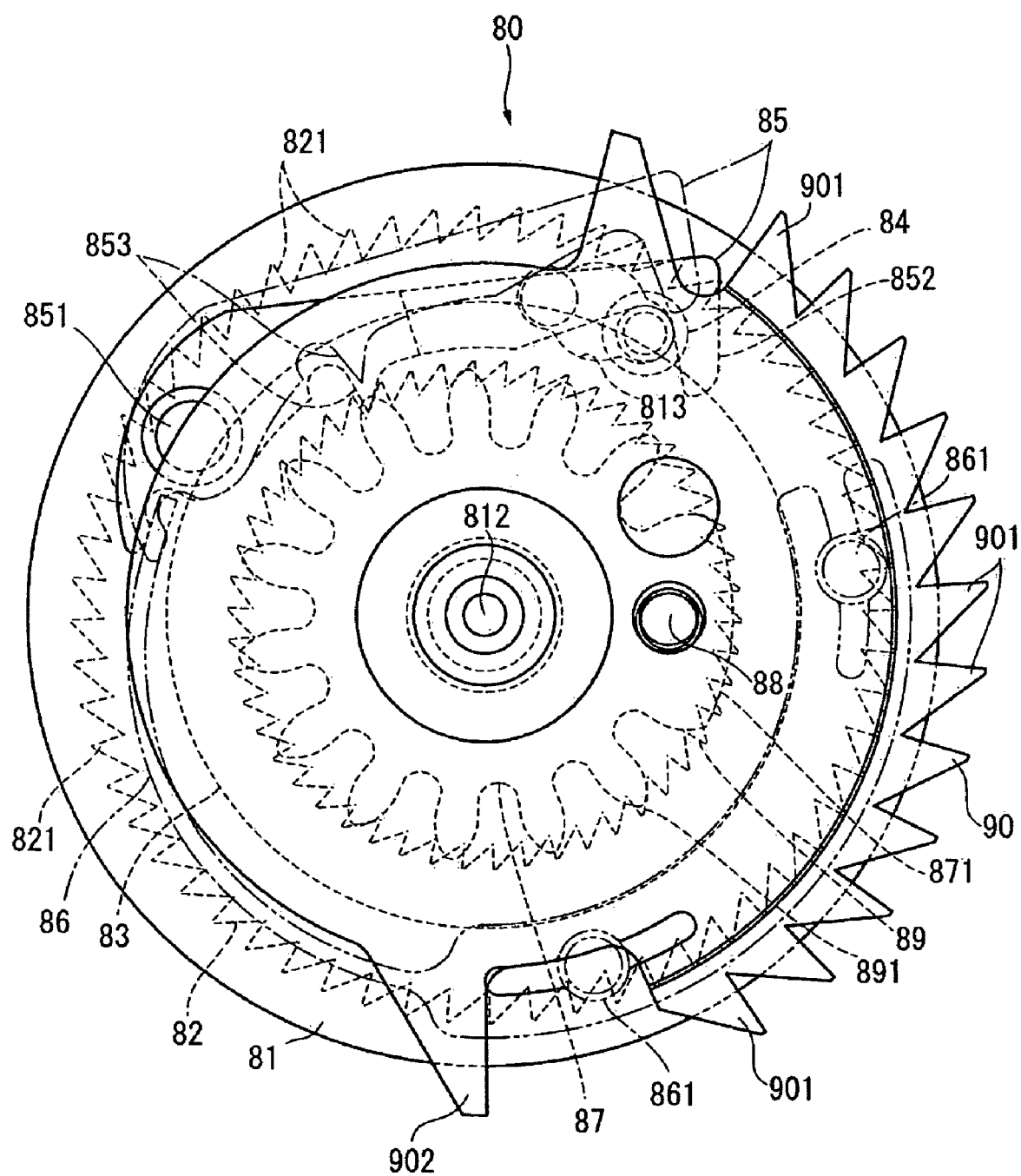
FIG. 7 is a plan view of the center wheel of the sonnerie mechanism.
Figure 8:
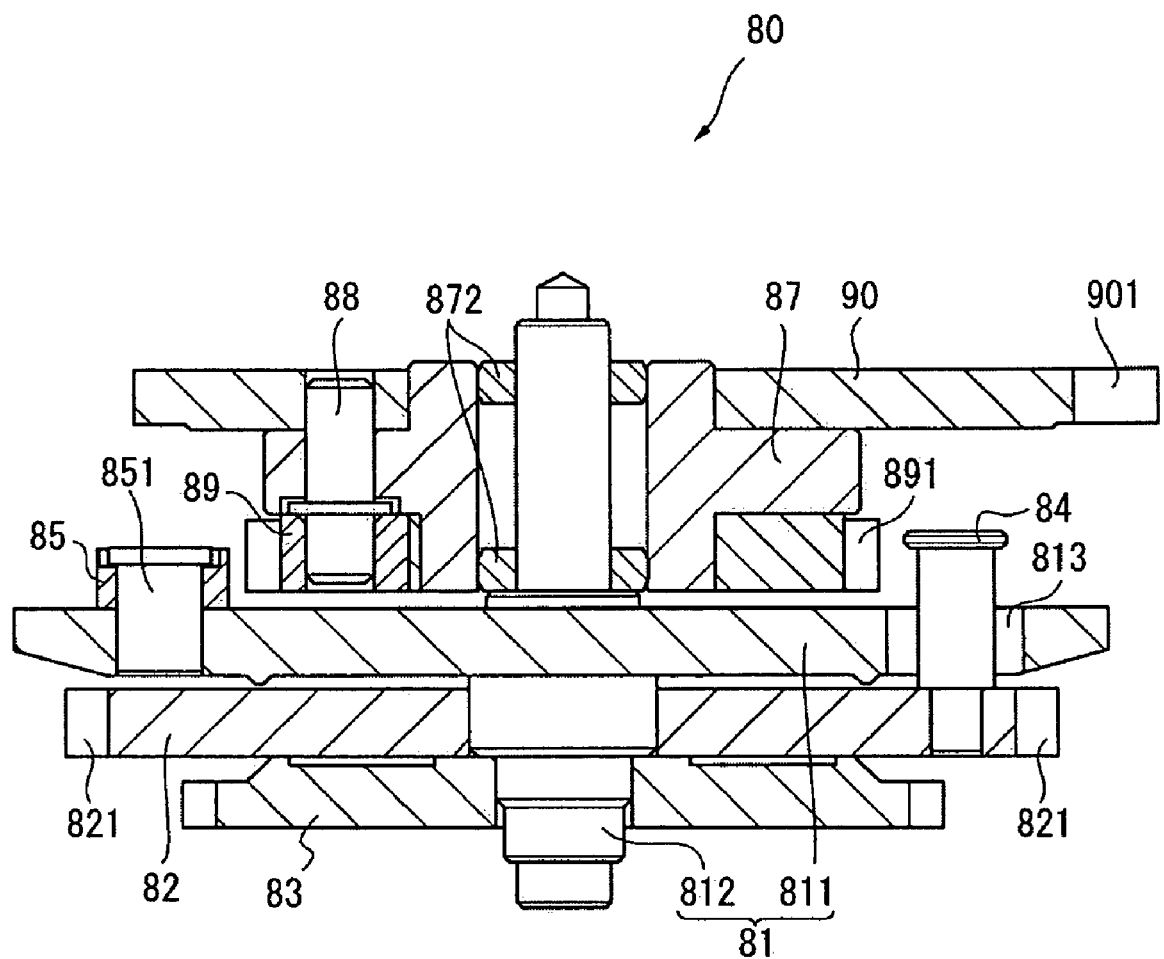
FIG. 8 is a section view of the center wheel of the sonnerie mechanism.

As shown in FIG. 7 and FIG. 8, the center wheel 80 has a driving roller 81, a release ratchet 82, a center wheel pinion 83, a release pin 84, a center wheel release click 85, a center wheel release click spring 86, a gathering rack pinion 87, a gathering rack pinion positioning pin 88, a driving ratchet 89, and an hour ratchet 90.

The driving roller 81 includes a disk 811 and an axle 812. The axle 812 is supported freely rotatably on the plate 5 and train wheel bridge 6.

The release ratchet 82 is disposed on the plate 5 side of the driving roller 81, and is inserted freely rotatably on the axle 812. This release ratchet 82 is substantially disk shaped and has triangular teeth 821 around the outside for engaging the release lever click 63 of the release lever 60.

After assembling the release ratchet 82 onto the axle, the center wheel pinion 83 is press fit onto the axle 812 from the plate 5 side. The center wheel pinion 83 is a circular gear that meshes with the speed increasing wheel train 32 for transferring rotation from the barrel wheel 31 as shown in FIG. 1.

The release pin 84 is press fit to the release ratchet 82 and is disposed passing through a hole 813 formed in the disk 811 of the driving roller 81. This hole 813 is an oblong hole of a specific length in the circumferential direction of the disk 811.

The center wheel release click 85 is affixed freely rotatably to the disk 811 of the driving roller 81 by a flanged pin 851. The center wheel release click 85 has an engaging part 852 for engaging the release pin 84, and a pawl 853 for engaging the triangular teeth 891 of the driving ratchet 89 as further described below.

The center wheel release click spring 86 is fixed on the disk 811 of the driving roller 81 by a pin 861. The distal end of the center wheel release click spring 86 engages the center wheel release click 85 and urges the center wheel release click 85 to rotate clockwise on the flanged pin 851.

The gathering rack pinion 87 has teeth around the outside and a toothless portion 871 where no teeth are formed. A jewel 872 is press fit into a through-hole formed in the center of the gathering rack pinion 87. The gathering rack pinion 87 is fit onto the axle 812 from the train wheel bridge 6 side of the disk 811, and is supported freely rotatably by the axle 812.

The gathering rack pinion positioning pin 88 is press fit to the gathering rack pinion 87 and is also inserted to the driving ratchet 89 and hour ratchet 90. The gathering rack pinion positioning pin 88 therefore determines the position of the gathering rack pinion 87, driving ratchet 89, and the hour ratchet 90.

The driving ratchet 89 is located on the plate 5 side of the gathering rack pinion 87, and is press fit to and positioned by the gathering rack pinion positioning pin 88. The entire outside circumference of the driving ratchet 89 is populated by triangular teeth 891. The pawl 853 of the center wheel release click 85 meshes with these triangular teeth 891.

The hour ratchet 90 is located on the train wheel bridge 6 side of the gathering rack pinion 87, and is press fit to and positioned by the gathering rack pinion positioning pin 88. Twelve triangular teeth 901 are formed on part of the outside circumference of the hour ratchet 90.

The hour ratchet 90 also has a pawl 902 for stopping the hammer to prevent the hammer 34 from operating when the sonnerie mechanism 3 is stopped.

Operation of the Sonnerie Mechanism

The operation of the sonnerie mechanism 3 thus comprised is described briefly below.

Torque from the barrel wheel 31 is normally transferred through the speed increasing wheel train 32 to the center wheel 80, and this torque urges the center wheel 80 counterclockwise as seen in FIG. 1. The center wheel 80 [50, sic] does not turn and remains stationary, however, because the toothless portion 871 of the gathering rack pinion 87 and the stop 76 of the hour repeating rack 70 are pressed together.

When the cannon pinion 7 then turns, the stud 41 on the screw nut 40 contacts the beak 62, and the release lever 60 turns counterclockwise as seen in FIG. 1, the release lever click 63 engaged with the triangular teeth 821 causes the release ratchet 82 to turn. The release pin 84 therefore moves in the oblong hole 813 of the driving roller 81, and moves circularly counterclockwise as seen in FIG. 1 against the force of the center wheel release click spring 86 that pushes the center wheel release click 85 towards the center of the center wheel 80.

As a result, the pawl 853 of the center wheel release click 85 engaged with the triangular teeth 891 of the driving ratchet 89 disengages the triangular teeth 891.

When the pawl 853 releases, the gathering rack pinion 87 can rotate freely on the driving roller 81. As a result, the hour repeating rack 70, which turns counterclockwise as seen in FIG. 1 due to the force of the deflected hour repeating rack spring 77, causes the gathering rack pinion 87 that is engaged with the teeth 75 of the hour repeating rack 70 to rotate instantaneously counterclockwise as seen in FIG. 1 until the distal end of the hour repeating rack click 73 contacts a face 52A of the snail wheel 50.

The hour ratchet 90 affixed to the gathering rack pinion 87 therefore turns clockwise while the triangular teeth 901 on the outside of the hour ratchet 90 trip the hammer trip 341 attached freely rotatably on the support pin of the hammer 34.

The outside circumference of the snail plate 52 of the snail wheel 50 contacted by the distal end of the hour repeating rack click 73 is divided into twelve parts rendering faces 52A (sides) each having a specific length from the center corresponding to the time. The angle that the center wheel 80 turns, that is, the angle that the hour repeating rack 70 turns, when the center wheel release click 85 disengages the driving ratchet 89 is therefore determined by the rotational position of the snail wheel 50.

More specifically, the snail wheel 50 has a star wheel 51 with twelve teeth 51A below the snail plate 52. When the screw nut 40 turns one revolution per hour in unison with the cannon pinion 7 (minute hand), the pin 42 press fit to the disk engages the star wheel 51 of the snail wheel 50 before the stud 41 contacts the beak 62, and the snail wheel 50 rotates one hour (1/12 revolution =30 degrees). Because a triangular tooth click is pressed against the star wheel 51, the snail wheel 50 also rotates with a click and is positioned.

The size of the gathering rack pinion 87, the hour repeating rack 70, and the snail wheel 50 are set so that when the center wheel release click 85 disengages, the number of triangular teeth 901 on the hour ratchet 90 that trip the hammer trip 341 is equal to the number of hours indicated by the snail wheel 50.

When the center wheel release click 85 disengages and is released from the gathering rack pinion 87, the driving roller 81 starts turning counterclockwise as seen in FIG. 1 as a result of the torque transferred from the barrel wheel 31 through the speed increasing wheel train 32 and center wheel pinion 83.

The rotational speed of the driving roller 81 is determined by the speed of the barrel wheel 31, and the barrel wheel 31 rotates at an extremely slow speed as controlled by the governor 2 described above.

When the driving roller 81 turns in unison with the center wheel pinion 83, the force of the center wheel release click spring 86 causes the center wheel release click 85 that was raised by the release pin 84 to again engage the driving ratchet 89 because the release ratchet 82 remains pressed against the release lever click 63 and held stationary.

As a result, the gathering rack pinion 87 is constrained by the center wheel release click 85 and turns counterclockwise in unison with the driving roller 81.

The triangular teeth 901 of the hour ratchet 90 riding over the hammer trip 341 push and cause the hammer trip 341 to move counterclockwise. This circular movement of the hammer trip 341 causes the hammer 34 to lift away from the gong 33 in resistance to the urging force of the hammer spring 342. As the hour ratchet 90 continues to turn and the triangular tooth 901 disengages the hammer trip 341, the hammer spring 342 returns the hammer 34 towards the gong 33 and causes the hammer 34 to strike the gong 33.

The gong 33 is struck each time the center wheel 80 turns and a triangular tooth 901 of the hour ratchet 90 trips the hammer trip 341. As a result, the gong 33 is struck according to the rotational position of the snail wheel 50, that is, the number of hours in the time read from the snail wheel 50. The user can therefore know the hour from the number of times the gong sounds.

When the gong 33 sounds the number of hours in the time read from the snail wheel 50, the toothless portion 871 of the gathering rack pinion 87 contacts the stop 76 of the hour repeating rack 70, and the center wheel 80 stops turning.

The pawl 902 of the hour ratchet 90 therefore contacts the hammer trip 341 as shown in FIG. 1, and the hammer trip 341 is prevented from moving counterclockwise. The hammer trip 341 contacts the spring pin 343 of the hammer 34 at this time, and the hammer 34 is held at rest at a position separated from the gong 33. The gong 33 will therefore not sound when the sonnerie mechanism 3 is not operating, even if the hands are clapped or the wrist is shaken vigorously when the wristwatch is being worn.

When rotation of the cannon pinion 7 separates the beak 62 of the release lever 60 from the stud 41 of the screw nut 40, the force of the spring causes the release lever 60 to rotate clockwise and return to the initial position.

This completes the operation of the sonnerie (striking) mechanism 3.

Effect of the First Embodiment

This aspect of the present invention has the following effects.

1) The governor 2 according to this embodiment of the invention holds the operating speed of the sonnerie mechanism 3 that is driven by a barrel wheel 31 substantially constant by means of mechanical control, therefore does not require a control circuit or sensor, and therefore reduces cost and occupies less space. Furthermore, because the governor 2 is mechanical and does not require an electrical power supply, the governor 2 does not need to use power produced by a generator-governor when used in an electronically controlled mechanical timepiece 1, and therefore prevents shortening the operating time of an electronically controlled mechanical timepiece 1 as a result of increasing power consumption.

(2) The governor 2 is a contactless governor that utilizes the resistance of fluid viscosity, therefore does not produce wear particles, and eliminates soiling the mechanism and deterioration. The appearance is therefore not impaired by wear particles, periodic maintenance involving disassembling and cleaning to remove wear particles, replacing parts due to part wear, and adjustment is required less frequently, and the maintenance cost can therefore be reduced.

Furthermore, using a contactless governor that utilizes the resistance of fluid viscosity prevents noise. The absence of noise affords enjoying the clear, pure tone of the sonnerie mechanism when used in a timepiece 1 with a sonnerie mechanism.

(3) Because the rotor 200 rotates in only one direction with this governor 2, the damage and deterioration of colliding parts that is observed with a reciprocating swiss lever escapement can be prevented even if the rotor 200 turns at high speed.

Furthermore, because the governor 2 uses wings 210, the governor 2 can be rendered thinly and easily incorporated into a wristwatch 1.

(4) By using air as the viscous fluid, a housing or structure for sealing the viscous fluid is not required, and the governor can be easily rendered compactly and loss from the seal between the housing and axle can be prevented.

(5) The viscous load acting on the wings 210 can be increased by providing the opposing member 230 with opposing surfaces to the surfaces of the wings. The brake power per volume ratio can therefore be increased, and the governor 2 and a timepiece 1 incorporating the governor 2 can be made smaller. The speed increasing ratio of the drive power transfer wheel train 4 can therefore be reduced and the number of wheels in the wheel train can be reduced accordingly, thereby reducing the parts count, reducing cost, and improving space efficiency.

(6) By rendering an opposing plate 233 on both sides of the wings 210, the brake power of fluid viscosity resistance works on both sides of the wings 210, and the brake power can be increased compared with providing an opposing plate 233 on only one side while the rotor 200 in the governor 2 and the surface area of the opposing member 230 remain the same size.

Furthermore, because an opposing plate 233 is on each side of the wings 210, the total change in viscous resistance is small even if the wings 210 shift closer to one opposing plate 233 due to shaking, for example, because the gap to the other opposing plate 233 also increases. The speed of the governor 2 therefore remains stable and the operating speed of the device also remains substantially constant.

(7) The wings 210 are prevented from contacting other parts even if greater than expected torque is applied to the rotor 200 due to impact when the timepiece is worn or excessive force is applied to the wings 210 because the excessive wing movement prevention means that limits how far the wings 210 can fly to the outside prevents the wings 210 from moving outside from the preset position. In addition, the excessive wing movement prevention means can be rendered using only the spring catch stud 206 and finger 213, and is therefore simple, lightweight, and inexpensive.

(8) The wings 210 are positioned so that the weight of the plural wings is balanced. The balance is therefore held on the axis of rotation even when viscous resistance acts on the wings 210, the rotor 200 is prevented from tilting or rotating off-axis, and the rotor 200 therefore continues to rotate stably.

(9) Part of the outside edge of the wings 210 is shaped to overlap a circle that is concentric to the axis of rotation of the rotor when the wings 210 are spread to the maximum outside position, thereby maximizing the area where the wings 210 overlap the opposing member 230 when the wings 210 are at the maximum outside position, increasing the area near the outside part of the wings where the peripheral velocity is highest, and increasing the brake power. Brake power is therefore high relative to the size of the governor 2, and a governor 2 that produces sufficient brake power and is also space efficient can be provided.

(10) By using a flat zigzag spring 220 as the wing returning means, the thinness of the spring can be balanced by the amount of deflection, thus affording a thin rotor 200 and governor 2. A thin profile can therefore be achieved even when stacked with the wings 210, thus affording greater freedom in the horizontal layout. The wing members and spring can also be rendered in unison, thereby reducing the parts cost and assembly cost.

Furthermore, because the zigzag spring 220 has two zigzag spring parts 222 corresponding to the two wings 210 and a spring positioning part 221 rendered in unison connecting the two zigzag spring parts 222, only one positioning place is needed, a compact spring is afforded, the spring can be manufactured with fewer steps, and assembly and handling are easier.

(11) The wings 210 are substantially crescent shaped, axially supported freely rotatably to the rotor 200 by an intervening wing pin 211, and the wing pin 211 is rendered offset to one end from the center of gravity of the wing. As a result, friction resistance from the wing 210 support structure is reduced, the wings 210 can move smoothly, and the rotational speed of the governor 2 can be stabilized compared with wings that move parallel to the radial direction of the rotor 200.

(12) Spring deformation is also reduced when the wings 210 pivot because the zigzag spring 220 is attached offset toward the wing pin 211 from the center of gravity. As a result, the zigzag spring 220 is easier to set, and the zigzag spring 220 expands and contracts smoothly. Furthermore, because displacement of the zigzag spring 220 in the direction of rotation can be reduced, twisting of the zigzag spring 220 is reduced and the spring can expand and contract easily. There is also little sliding between the zigzag spring 220 and wing spring catch pin 212 and little concern about wear when the ring-shaped or C-shaped end of the spring 220 is hooked on the pin 212.

Second Embodiment

Figure 9A:
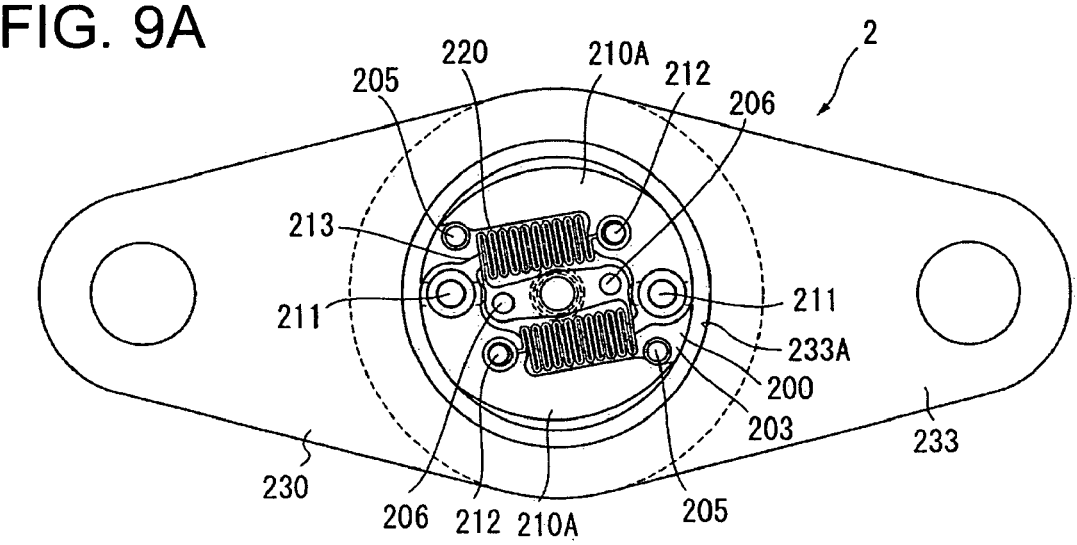
FIG. 9A is a plan view of the governor in a second embodiment of the invention.

A second embodiment of the invention is described next with reference to FIG. 9A to FIG. 9C. This second embodiment differs from the governor 2 of the first embodiment by slightly modifying the shape of the outside edge of the wings 210. Other aspects of this embodiment are the same as in the first embodiment, and further description thereof is thus omitted.

More specifically, the wings 210A in this second embodiment of the invention match the shape of the inside circumference edge of the opening 233A in the opposing plates 233. That is, part of the outside edge of the wing 210A, and even more specifically the profile of the edge from the distal end of the wing 210A to near the wing pin 211, conforms to the shape of the inside edge of the opening 233A in the opposing plates 233.

The governor 2 according to this embodiment of the invention affords the same effects as the first embodiment.

Figure 9B:
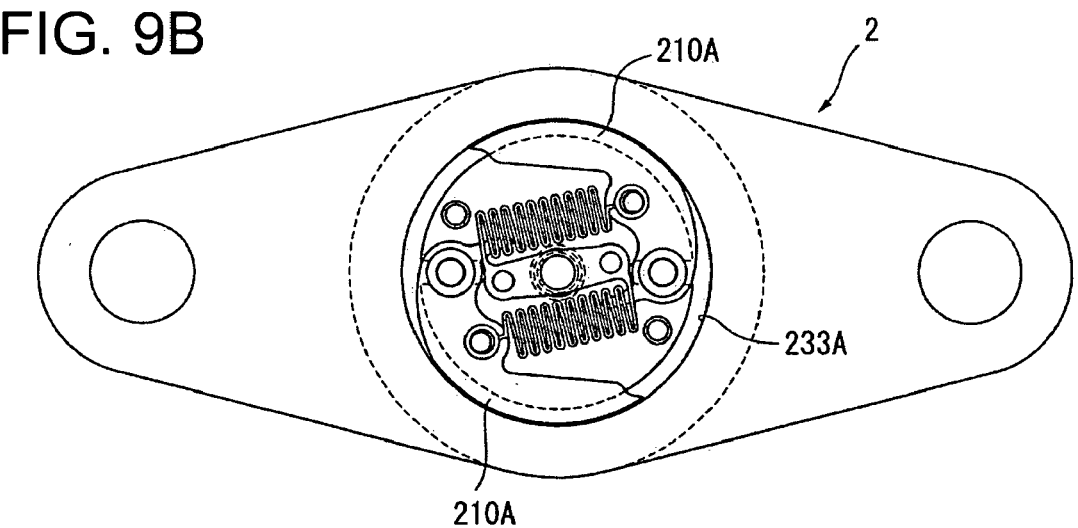
FIG. 9B is a plan view of the governor in a second embodiment of the invention.
Figure 9C:
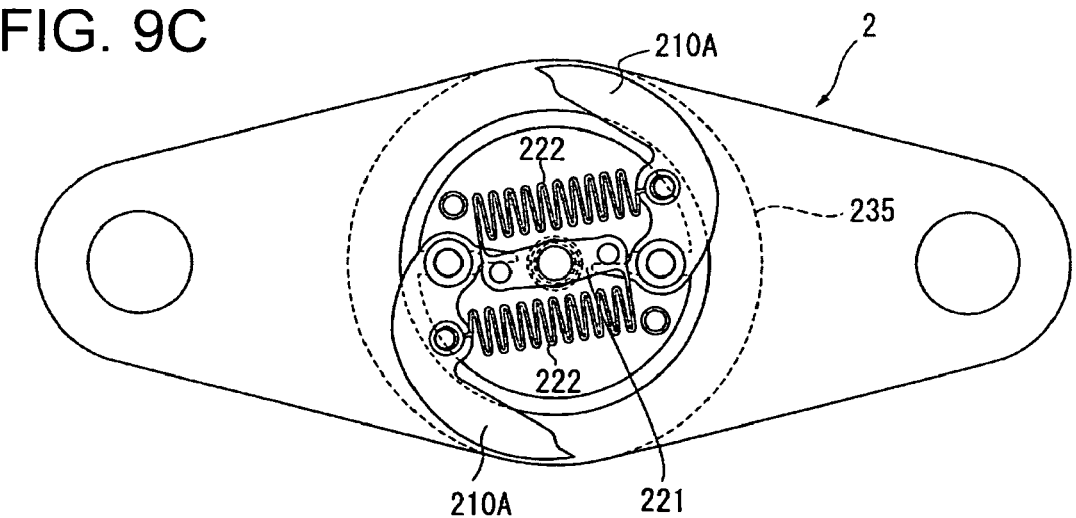
FIG. 9C is a plan view of the governor in a second embodiment of the invention.

In addition, the area of the wings 210A inserted between the opposing plates 233 when centrifugal force drives the wings 210A from the position shown in FIG. 9B to the position shown in FIG. 9C increases because the outside edge of the wings 210A follows the inside circumference surface of the opening 233A, and the air viscosity resistance is greater than in the first embodiment when a portion of the wings 210A enters the gap between the opposing plates 233. The difference in viscous resistance before and after the wings 210A overlap the opposing member 230 is therefore increased, and the rotor 200 speed can be better stabilized at the set speed.

Third Embodiment

Figure 10:
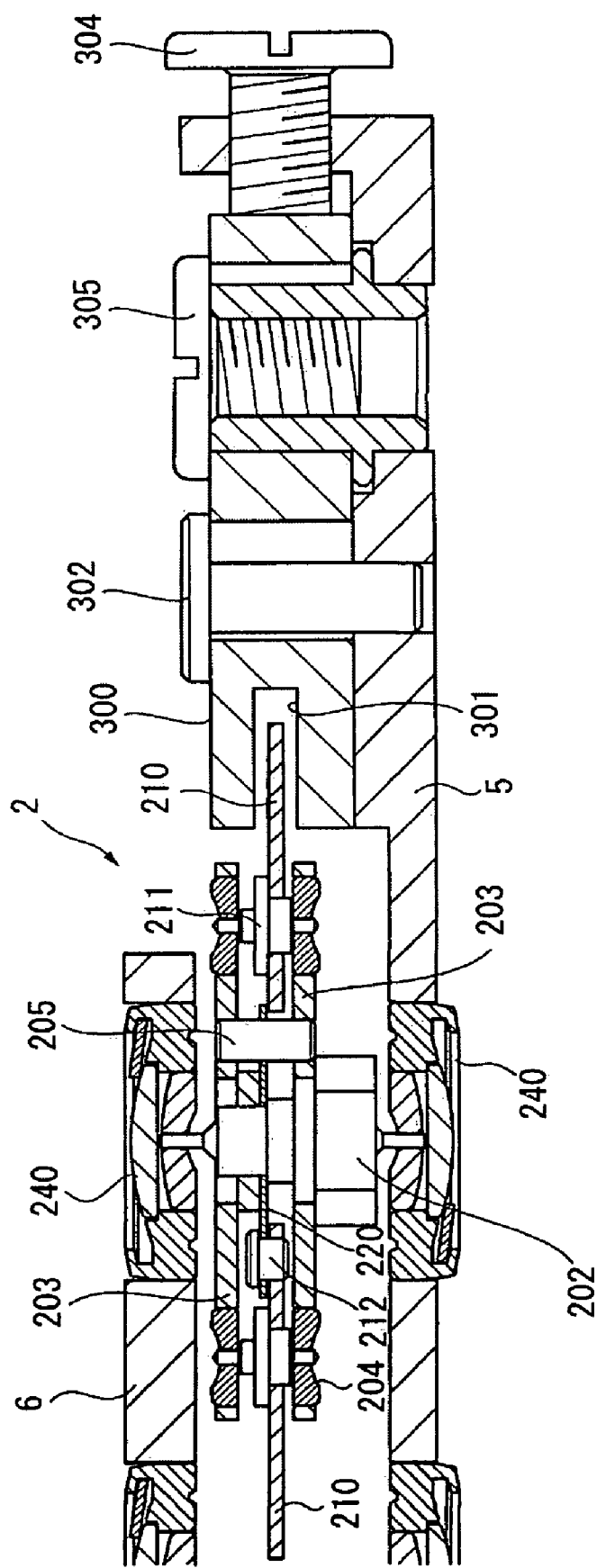
FIG. 10 is a section view of the governor in a third embodiment of the invention.
Figure 11:
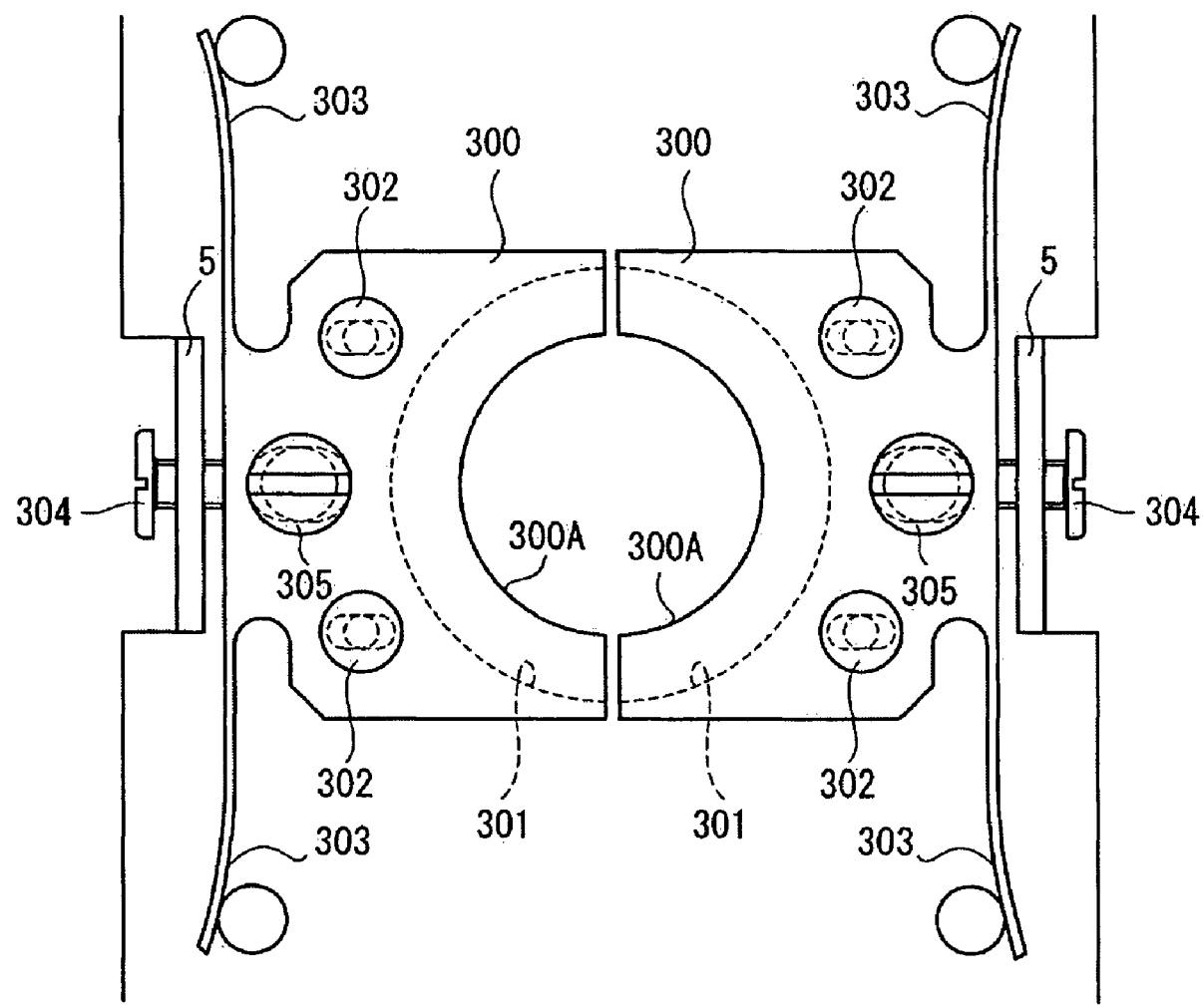
FIG. 11 is a plan view of the governor in a third embodiment of the invention.

As shown in FIG. 10 and FIG. 11, the opposing member 300 in this third embodiment of the invention renders the pair of opposing plates 233 above and below the governor 2 in unison. The opposing member 300 therefore has a channel 301 that the wings 210 enter when centrifugal force drives the wings 210 to the outside.

This embodiment of the invention assembles two opposing members 300 each having a C-shaped channel 301 to render a single annular channel 301.

The opposing members 300 can move linearly guided by guide pins 302 inserted to oblong holes rendered in the opposing members 300. A spring 303 formed in unison with each opposing member 300 urges the opposing members 300 apart, that is, away from the rotational axis of the rotor 200.

The opposing members 300 are disposed so that the gap between the opposing members 300 can be minutely adjusted using adjustment screws 304 screwed into the plate 5. More specifically, if the adjustment screws 304 are screwed in towards the rotational axis of the rotor 200, the opposing members 300 can be moved together in resistance to the urging force of the springs 303 pushing the opposing members 300 apart. Turning the adjustment screws 304 away from the rotational axis of the rotor 200 allows the urging force of the springs 303 to push the opposing members 300 apart.

This enables changing the horizontal area of the wings 210 that overlaps the opposing members 300, and thus enables tuning the rotational speed of the rotor 200 and thereby the operating speed of the sonnerie mechanism 3.

Because this speed adjustment is only required when the timepiece 1 is assembled, once the positions of the opposing members 300 are adjusted, each of the opposing members 300 is fixed to the adjusted position by means of a set screw 305.

The guide pins 302, springs 303, adjustment screws 304, and set screws 305 in this embodiment of the invention render a horizontal position adjustment means for adjusting the distance from the inside circumference edge 300A of each opposing member 300 to the center of rotor rotation.

The governor 2 using opposing members 300 according to this embodiment of the invention affords the same effects as the previous embodiments.

In addition, because the distance the wings 210 fly to the outside varies according to the centrifugal force, that is, the rotor speed, the viscous resistance working on the rotor 200 can be changed greatly at the speed at which the wings 210 begin to overlap the plane of the opposing members 300 by rendering a gap radially to the rotor 200 between the opposing members 300 and the wing position when the rotor 200 is stopped. The behavior of the wings 210 therefore repeatedly fluctuates minutely near the opposing member 300 boundary (inside circumference edge 300A). The speed of the rotor 200 can therefore be easily adjusted by controlling the speed increasing gear ratio, the number of speed increasing gears, the output torque of the energy source, and using the horizontal position adjustment means to adjust the radial position of the opposing members 300.

Furthermore, when the rotational speed of the rotor 200 is adjusted by changing the thickness of the spacer 232 between the opposing plates 233, the opposing plates 233 and train wheel bridge 6 must be removed each time the spacer 232 is replaced to adjust the speed, and the adjustment is therefore difficult.

This embodiment of the invention enables adjusting the speed by simply sliding the opposing members 300, however, and the rotational speed of the rotor 200 can therefore be adjusted easily.

This embodiment renders a gap between the opposing members 300, but the effect of this gap on the brake power applied to the wings 210 is small because the area of this gap relative to the area of the wings 210 overlapping the opposing members 300 is extremely small. Decrease in the brake power can also be overcome by closing the gap between the wings 210 and opposing members 300. More particularly, because the channels 301 are rendered in the opposing members 300, the gap can be set more precisely than when the gap is determined by inserting a spacer 232 as in the first embodiment, thus enabling setting the gap to the wings 210 with good precision.

Fourth Embodiment

Figure 12:
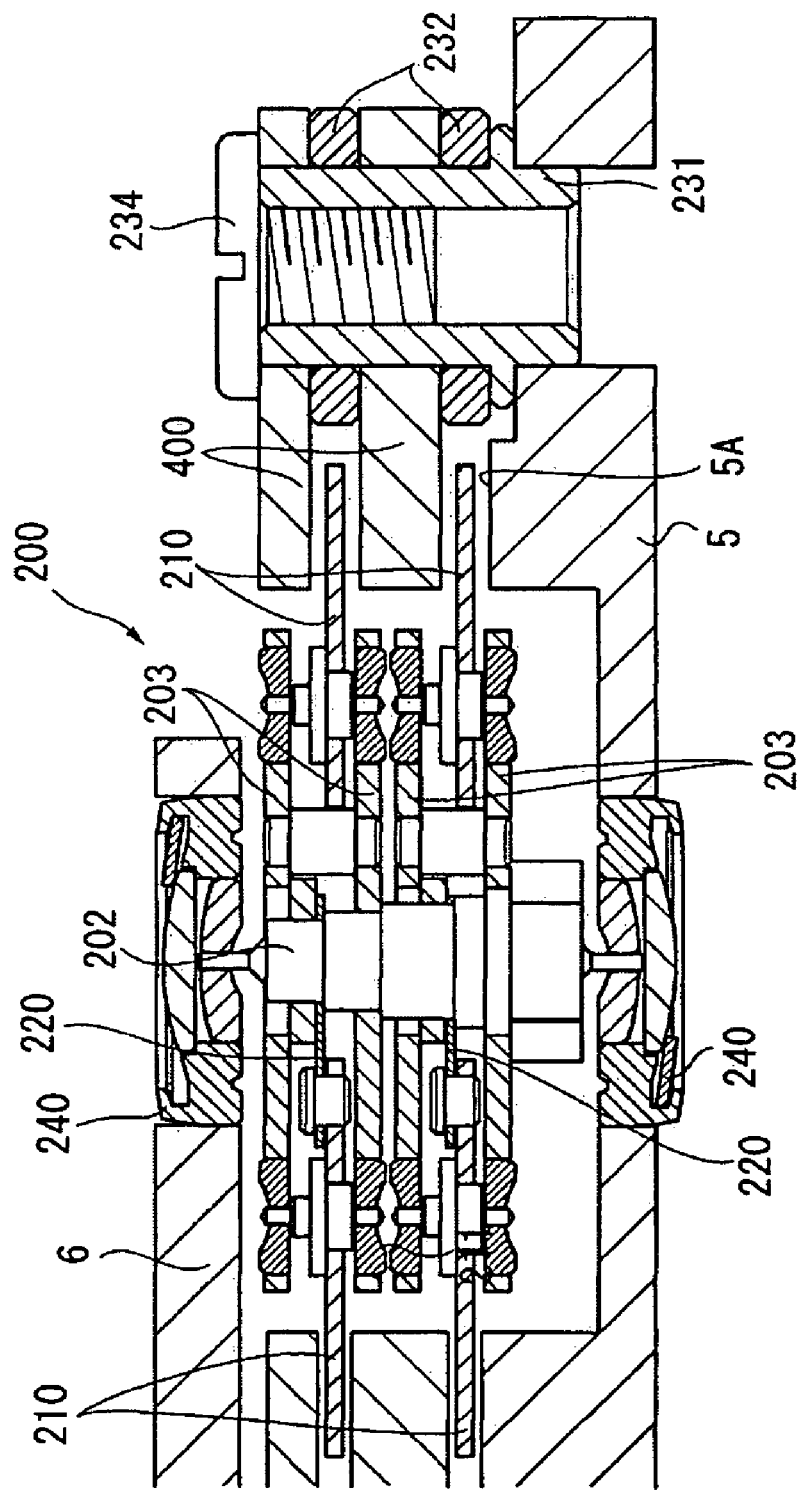
FIG. 12 is a section view of the governor in a fourth embodiment of the invention.
Figure 13:
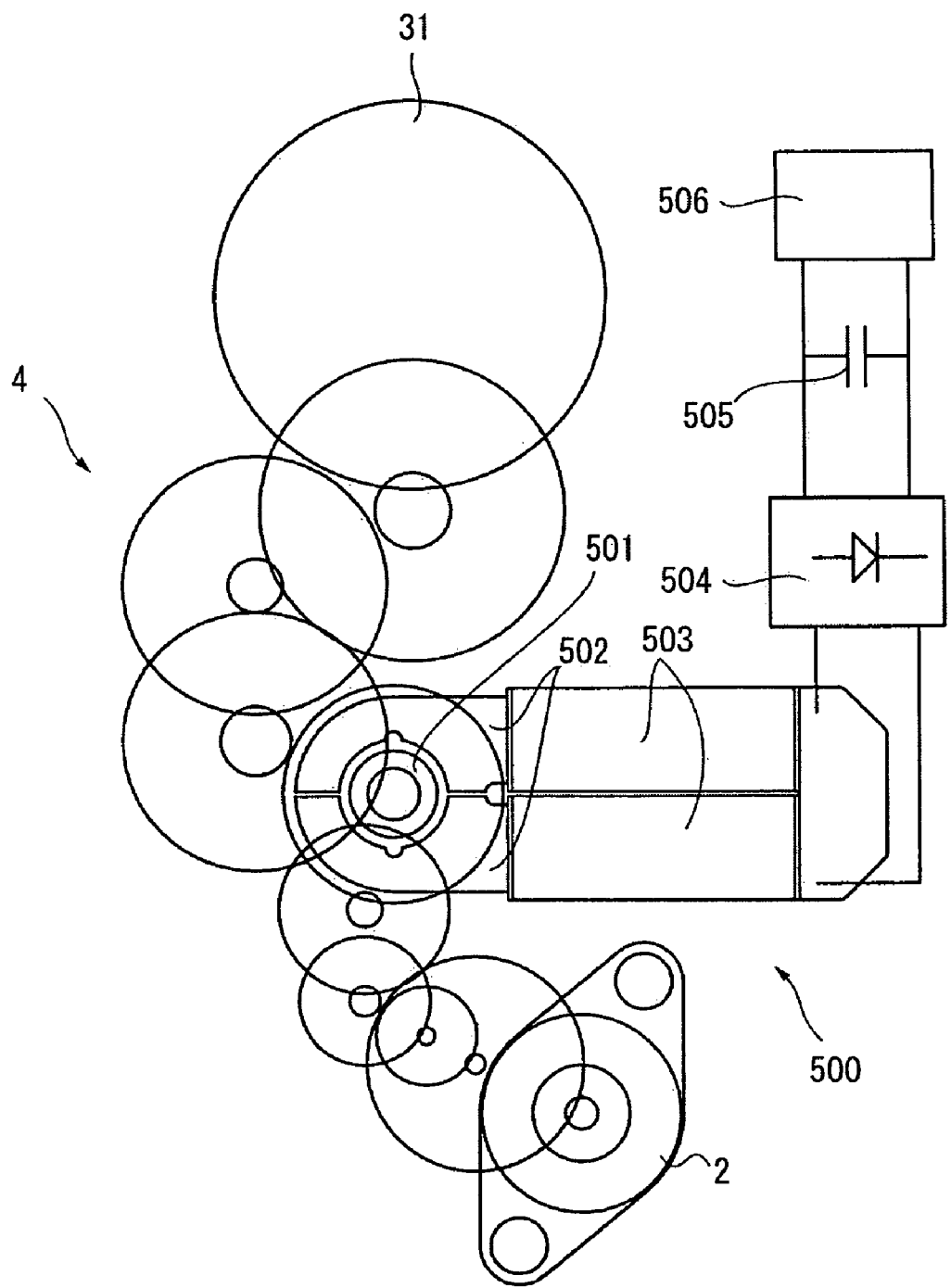
FIG. 13 shows a power generator according to a fifth embodiment of the invention.

This fourth embodiment of the invention disposes a plurality of wings 210 stacked vertically on the axis of rotation as shown in FIG. 12. The opposing member is disposed so that each layer of wings 210 enters a corresponding gap between opposing plates 400. In addition, a part of the 5 is also used as an opposing plate 5A as shown in FIG. 12.

Other aspects of this embodiment are the same as in the preceding embodiments and further description thereof is omitted.

This embodiment of the invention affords the same effects as the previous embodiments.

In addition, providing wings 210 in plural layers enables increasing brake power without changing the horizontal size of the governor 2.

Furthermore, if the wings 210 and opposing plates 400 are standardized and rendered so that the number combined in a single governor assembly can be selected according to the design specification (the brake power required by the governor), cost can be reduced while enabling use in devices with different brake power requirements.

Fifth Embodiment

Each of the preceding embodiments uses the governor 2 of this invention to regulate the operating speed of a sonnerie mechanism 3. This fifth embodiment uses the governor of the invention to govern the power generator rotor of a spring-driven electrical generator.

As in the previous embodiments, the governor 2 is linked to the barrel wheel 31 by an intervening drive power transfer wheel train 4 (speed increasing wheel train) in this embodiment. In addition, a power generator 500 is also connected to the drive power transfer wheel train 4.

The power generator 500 includes a generator rotor 501 that meshes with and is driven by a wheel in the drive power transfer wheel train 4, two stators 502 disposed with the generator rotor 501 therebetween, and a coil 503 wound to each stator 502. The coils 503 are connected to a capacitor 505 through an intervening rectifying circuit 504, and to an electronic device 506 as the load to which the power is supplied.

The generator rotor 501 is, for example, a rotor with a two-pole magnet for generating electrical power. The rectifying circuit 504 can be a full-wave or half-wave rectifier such as known from the literature. The capacitor 505 is a ceramic capacitor, for example.

The electronic device 506 used as the load could be an emergency radio with a built-in power generator, or a flashlight that uses an LED bulb and has a built-in power generator, for example. The power generator 500 can thus produce power by winding the spring in the barrel wheel 31, and can be used to supply power to electronic devices for portable or emergency use because batteries are not required.

Spring-driven power generators 500 such as this are used to freely rotate the rotor of the power generator by means of the torque from the spring, and the power generated while the rotor is turning charges a capacitor. However, because a large amount of power is generated in a short time when the rotor rotates freely, a capacitor with high capacitance must be used. A high capacitance capacitor can be rendered using a tantalum [tartar, sic] capacitor or electrolytic capacitor, but the capacitance of such capacitors decreases over time with repeated charge-discharge cycles, and may become unable to store sufficient power.

Electronically controlled generators that control the rotor speed by electrically braking the generator are known from Japanese Unexamined Patent Appl. Pub. H11-166980, for example. The advantage is that this generator-governor can produce a constant level of power for a relatively long time.

The problem is that power for driving the control IC and quartz oscillator must also be generated in addition the power used by the electronic device 506 that is the load, and the percentage of the generated power than can be supplied to the load therefore decreases.

This embodiment of the invention, however, mechanically governs the generator rotor 501 by means of the governor 2 of the invention, therefore does not require the control IC and quartz oscillator that are needed for electronic control, and therefore eliminates power consumption by those devices. By adjusting the speed by means of this governor 2, power consumed only by the load can be generated at a constant level for a long time, power consumption by other than the load can be eliminated, and wasting spring energy can be eliminated. The operating time can therefore be increased using the same spring used to drive an electronically controlled generator because power consumption is less.

The invention is not limited to the preceding embodiments.

When the gap between the opposing plates 233 is adjusted by changing the spacer 232, for example, an arrangement that does not require removing the train wheel bridge 6 is also possible. This can be achieved by separating the part of the train wheel bridge 6 that axially supports the rotor 200 from the other part of the train wheel bridge, and rendering the rotor bridge that axially supports the rotor 200 as a cantilever. In addition, the part of the opposing plate that opposes the wing 210 is rendered in a C-shaped configuration that avoids the rotor bridge when seen in plan view. As a result, the opposing plate can be removed to easily replace the spacer 232 without disassembling the rotor bridge.

The plate 5, train wheel bridge 6, or other member to which the rotor 200 bearing is fixed can also be used as an opposing plate. The gap between the opposing plate and the wings 210 can be set and the brake power can be adjusted in this arrangement by adjusting the height of the rotor 200 from the plate 5 or train wheel bridge 6.

Where the zigzag spring 220 connects to the wing 210 is also not limited to being offset to the wing pin 211 from the center of gravity of the wing, and can be offset toward the distal end of the wing from the center of gravity. The shape of the wings 210 is also not limited to basically a crescent shape as described above, and the shape can be designed according to the number of wings disposed to the rotor 200.

The wings 210 are also not limited to being attached freely rotatably to the rotor 200 and rotating with centrifugal force to move to the outside, and can be arranged to move in parallel due to centrifugal force.

Separate zigzag springs 220 can also be used for each wing 210. The wing returning means is also not limited to a zigzag spring 220 and a coil spring, for example, could be used. However, a zigzag spring 220 is much preferred for incorporation in a wristwatch 1 that is small and thin.

The number of wings 210 disposed to the rotor 200 is also not limited to two, and one or three or more wings can be used. Using only one wing, however, makes maintaining the proper weight balance difficult when the rotor 200 turns. In addition, using three or more wings means that the size of each wing 210 becomes smaller, and the construction more complex and therefore costly. As a result, using two wings is preferred.

An excessive wing movement prevention means is not necessarily required, but providing one can more reliably prevent wing 210 damage.

The opposing members 230, 330 are not limited to being rendered on both sides of the wings 210 and can be rendered on only one side, but rendering the opposing members on both sides doubles the brake power and enables reducing the size accordingly.

Air is the preferred fluid intervening between the wings 210 and the opposing members 230, 300, but the invention is not limited to using air. A liquid or other fluid can be used instead. In such cases, however, a housing and seal for containing and sealing the fluid are necessary, and air is therefore the preferred fluid.

Figure 14:
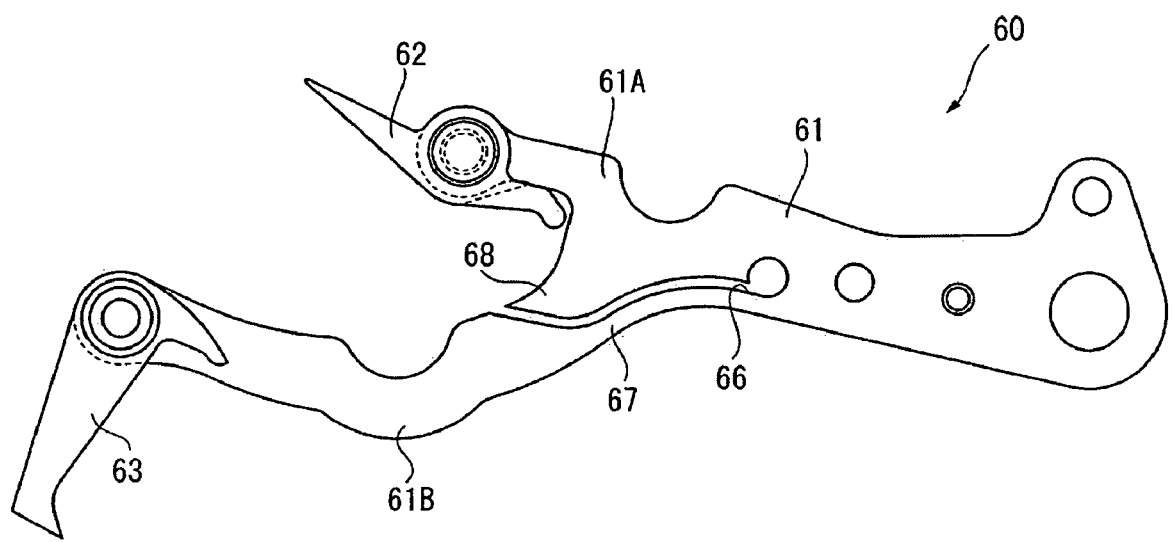
FIG. 14 is a plan view showing a variation of the main lever portion of the release lever.

As shown in FIG. 14, the release lever 60 can be alternatively rendered with a slot (channel) 66 between the arm 61A to which the beak 62 of the main lever 61 is attached and the arm 61B to which the release lever click 63 is attached.

With this main lever 61, the part of the arm 61B disposed along the slot 66 is a constricted portion that is narrower than the rest of the arm 61B. This constricted portion is a flexible part 67 that can deform elastically, and the release lever 60 is therefore constructed with elasticity between the beak 62 and release lever click 63.

A rigid backup part 68 is also rendered on the arm 61A side of the slot 66.

A slot 66 is thus formed between a flexible part 67 and a rigid backup part 68, and the width of this slot 66, that is, the gap between the flexible part 67 and rigid backup part 68, is substantially constant.

Figure 15:
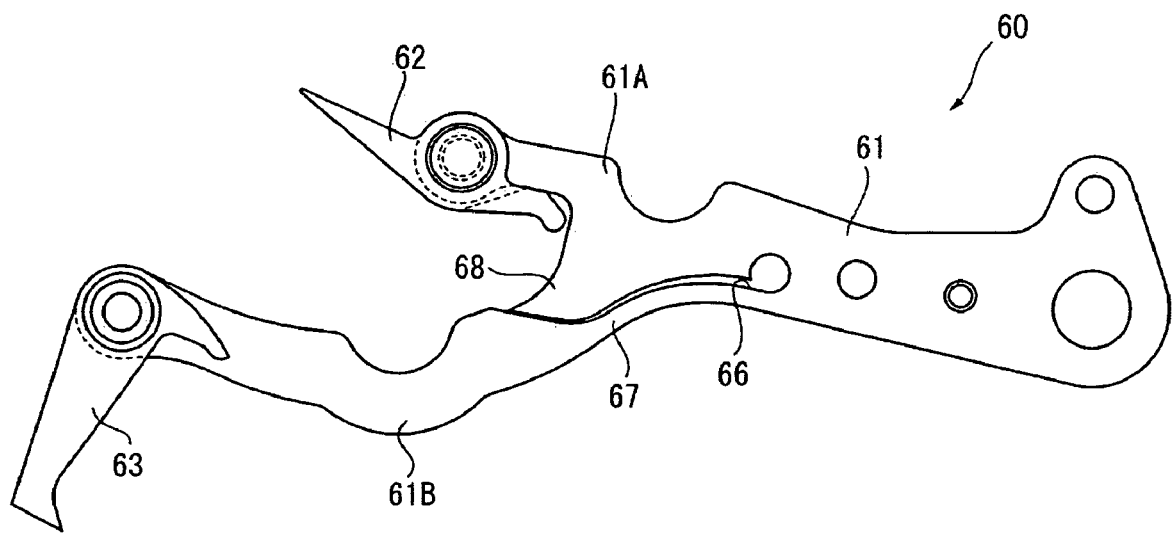
FIG. 15 is a plan view showing the flexible part of the release lever shown in FIG. 14 deformed.

When the release lever 60 having this slot 66 and flexible part 67 is moved circularly by the screw nut 40, the flexible part 67 deforms until the flexible part 67 contacts the rigid backup part 68 as shown in FIG. 15.

As a result, if the driving roller 81 spins momentarily at high speed due to the effect of backlash in the drive power transfer wheel train 4, for example, the release ratchet 82 can be rotated at high speed in the same direction as the driving roller 81 by means of the deformed flexible part 67 returning to the original position.

The center wheel release click 85 therefore does not disengage the release pin 84, the center wheel release click 85 and driving ratchet 89 can be prevented from engaging before the hour repeating rack 70 reads the accurate time, and the striking mechanism can be operated stably and accurately.

The governor 2 in these embodiments of the invention uses a rotor 200 that rotates at high speed, therefore has a correspondingly large number of wheels in the drive power transfer wheel train 4, and is subject to the corresponding effects of backlash. A release lever 60 having a flexible part 67 as described in this aspect of the invention, however, reliably prevents operating problems caused by backlash, and can be used quite effectively in a timepiece having this governor 2 and drive power transfer wheel train 4.

By rendering a rigid backup part 68 in addition to the flexible part 67 in this release lever 60, the flexible part 67 also acts as a rigid member after the flexible part 67 deforms to where it contacts the rigid backup part 68. The timing at which the center wheel release click 85 and driving ratchet 89 disengage after the release lever 60 is pushed by the screw nut 40 can therefore be set by means of the distance the flexible part 67 travels to contact the rigid backup part 68, or more specifically by means of the width of the slot 66 and the shape and dimensions of the other parts. As a result, once the hands are accurately attached, the sonnerie mechanism 3 can be adjusted to always sound at the hour.

Figure 16:
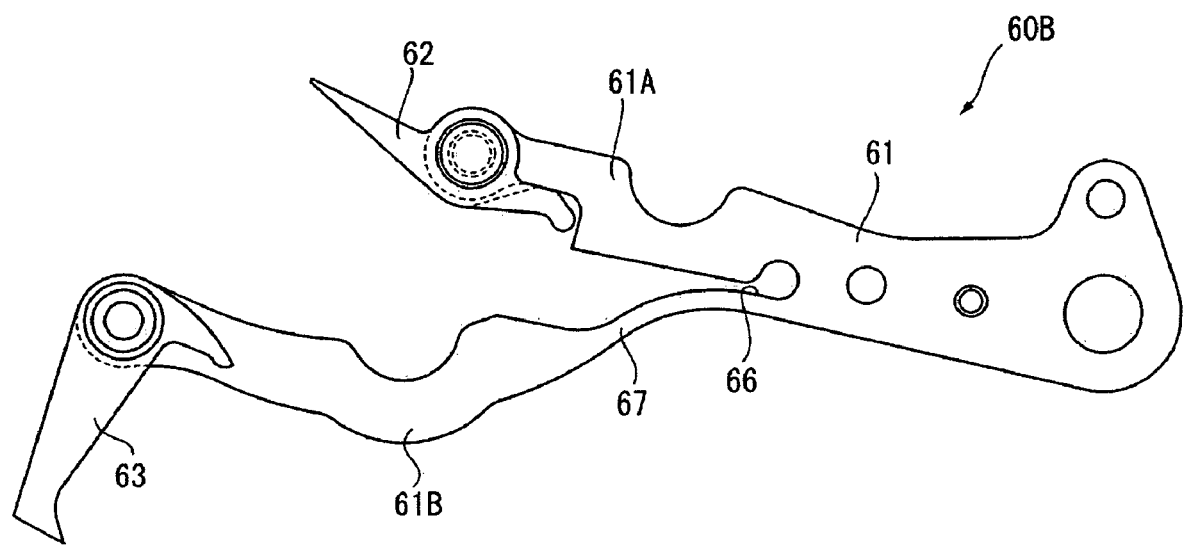
FIG. 16 is a plan view showing another variation of the main lever portion of the release lever.

As shown in FIG. 16, the release lever can also be rendered as a release lever 60B without a rigid backup part 68.

Working Models

A working model of a governor 2 according to a first aspect of the invention was manufactured and tested as described below.

Figure 17:
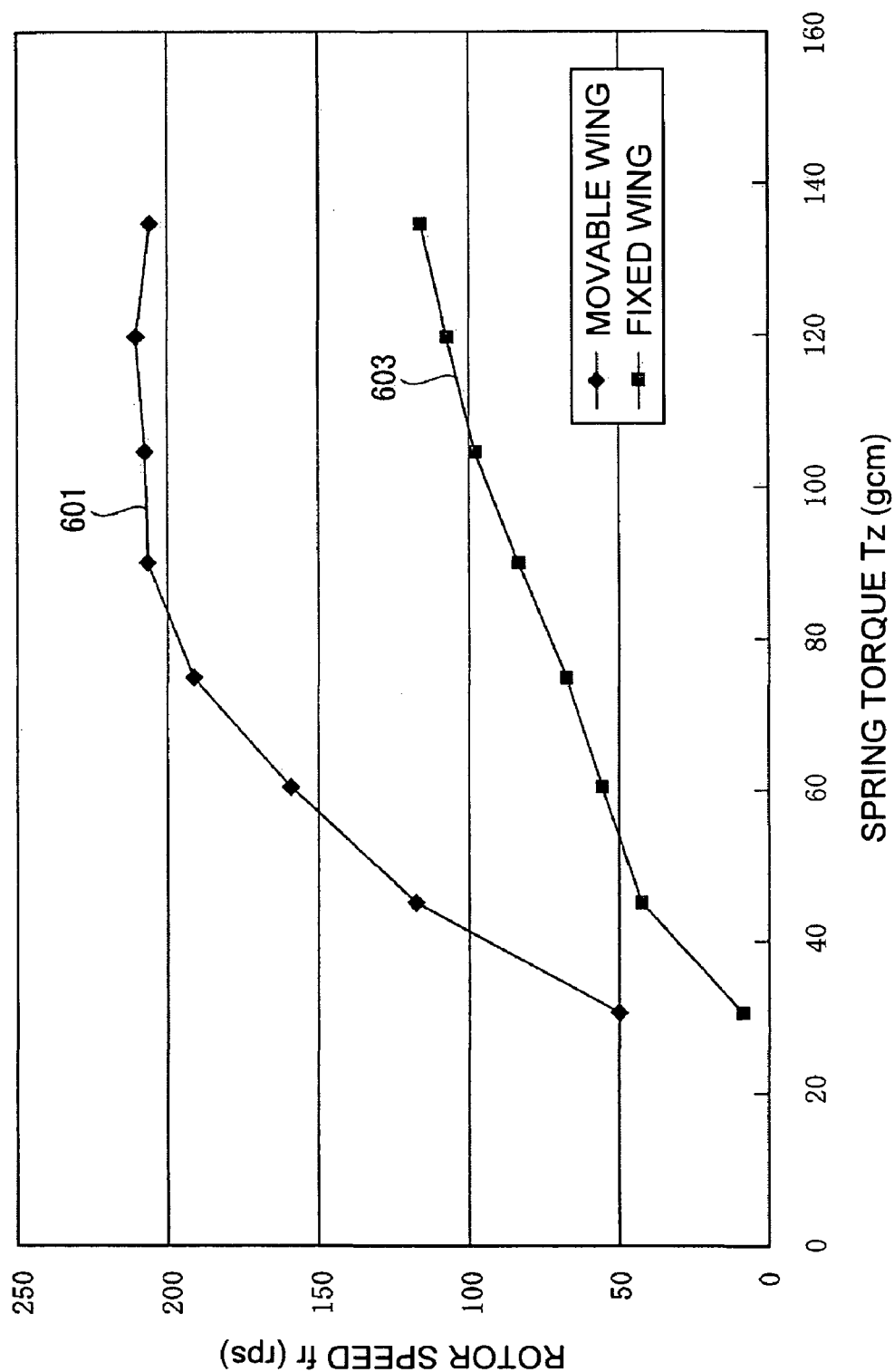
FIG. 17 is a graph showing test results using a working model of the invention.
Figure 18:
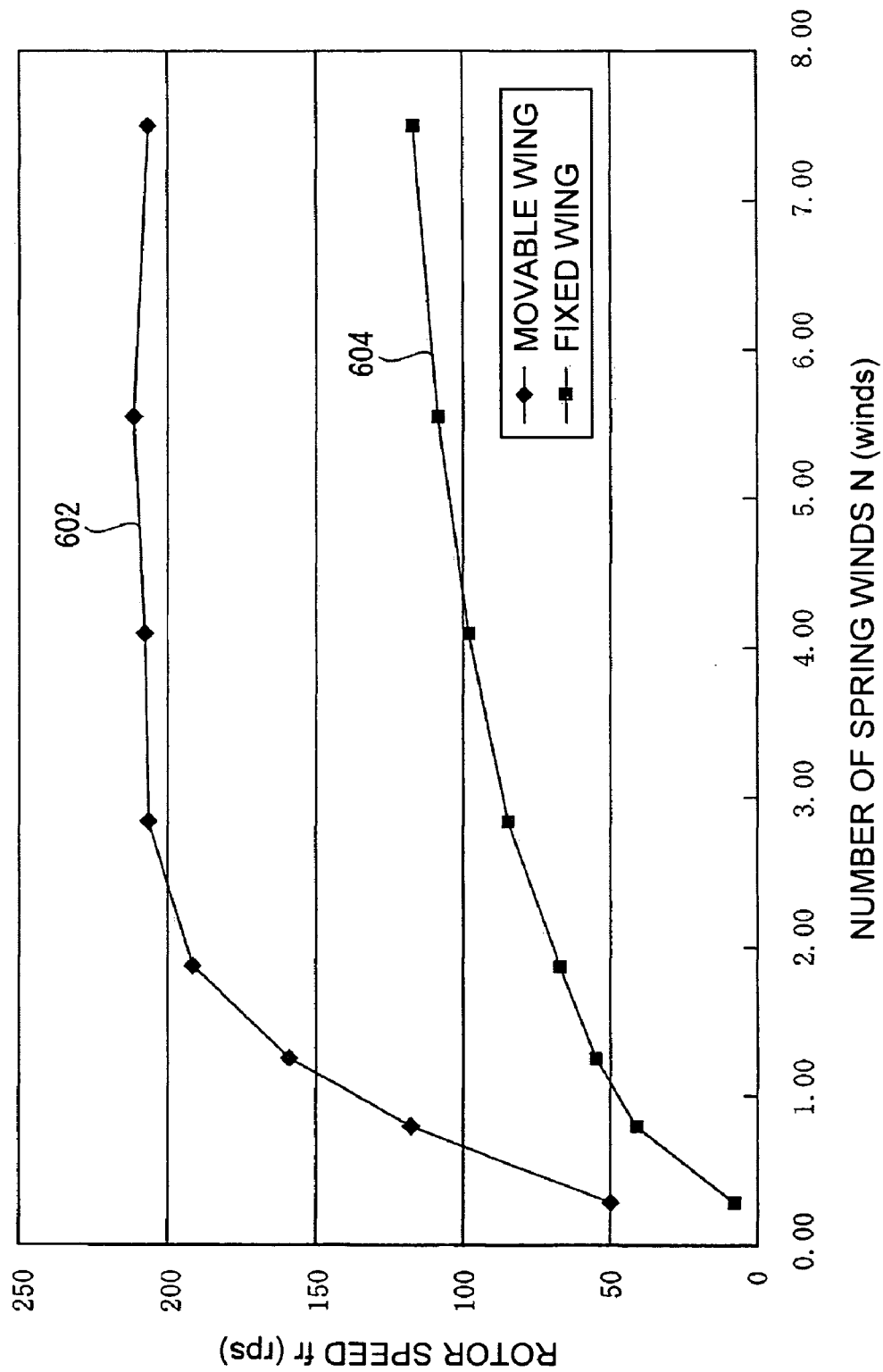
FIG. 18 is a graph showing test results using a working model of the invention.

Curves 601 and 602 in graphs 1 and 2 shown in FIG. 17 and FIG. 18 show the results of measuring the rotational velocity of the rotor 200 when the torque transferred to the rotor 200 was adjusted by changing the times the spring was wound. These test results were obtained with no variation in the load from the hammer 34, for example, in the first embodiment.

The conditions used in this test are shown below.

Speed increasing ratio from the barrel wheel to the rotor: 176,400 times

Number of tooth engagements in the wheel train from the barrel wheel to the rotor: 8

Diameter of the wing guide plate in the rotor: 4 mm

Wing material: stainless steel

Wing thickness: 0.1 mm

Wing weight (1 wing): 0.0031 g

Opposing plate to wing gap: wing to top plate gap wing to bottom plate gap

Spring coefficient of wing return spring (zigzag spring): 0.00874 (kgf/mm)≈0.08571 (N/mm)

Diameter of opening 233A in opposing plates: 4.5 mm

Maximum outside circumference of wings (outside diameter of channel portion of opposing plates): 6.0 mm Curves 603 and 604 in graphs 1 and 2 show the results under the same conditions but using a fixed wing (a 6 mm diameter disk) instead of the rotor described in the preceding embodiments of the invention.

These results show that the rotor speed increases with a fixed wing as the number of times the spring is wound increases and spring torque increases. With a governor 2 according to the present invention having movable wings, however, rotor rotation is not affected by the number of spring winds and the torque after the spring is wound three times, and the governor 2 functions as a constant speed governor.

Figure 19:
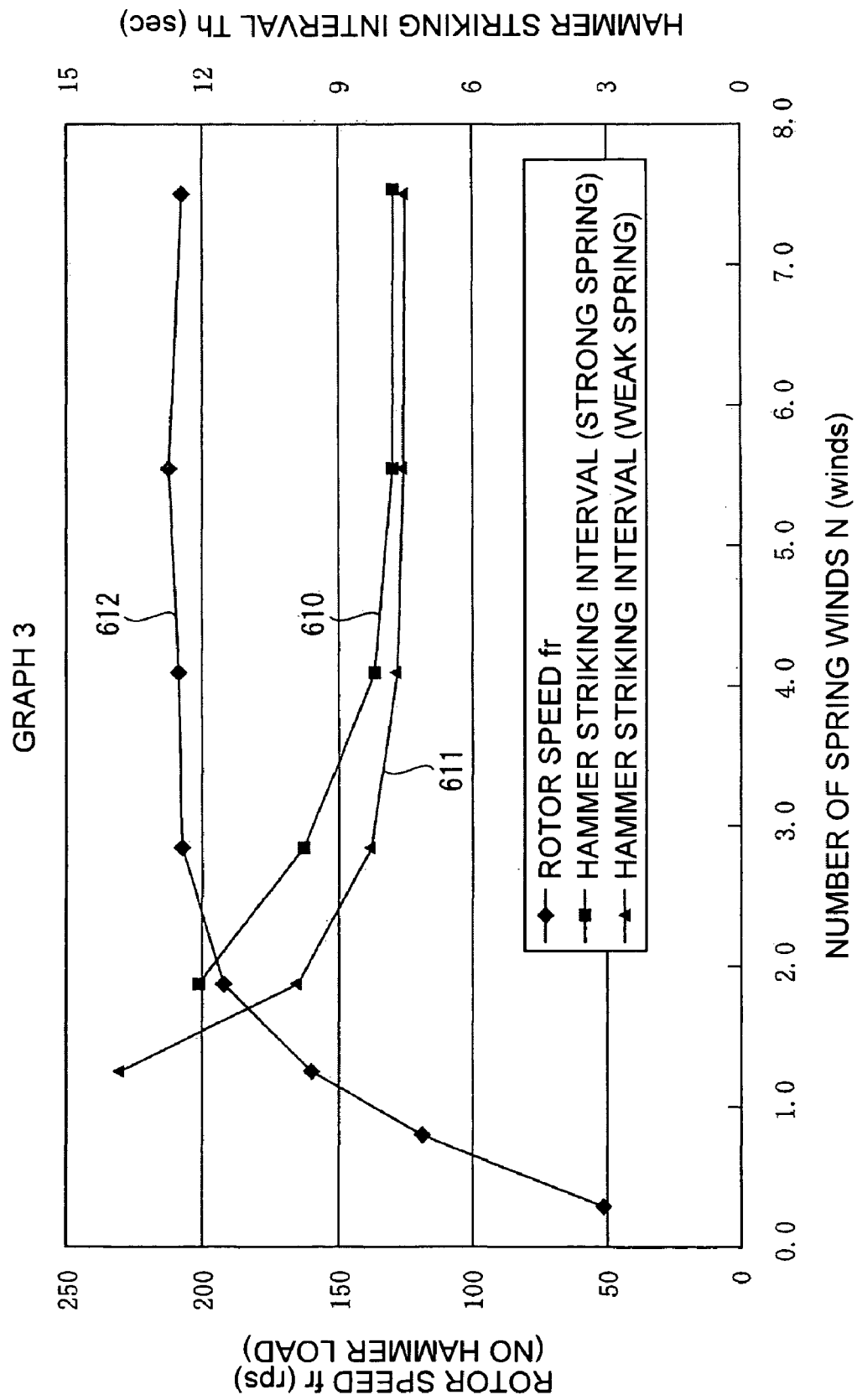
FIG. 19 is a graph showing test results using a working model of the invention.

Graph 3 shown in FIG. 19 shows the test results obtained when driving the sonnerie mechanism 3 of the first embodiment with the hammer 34. Curves 610 an 611 show the average striking interval of the hammer 34 when the time from the first strike to the twelfth strike is divided into eleven equal parts. Curve 612 shows the change in rotor speed at various spring winding counts.

These results show that until the spring is wound approximately four times, the hammer 34 striking interval is unaffected by the number of spring winds, that is, spring torque, and remains substantially constant even when the load varies such as when driving a hammer 34.

Figure 20:
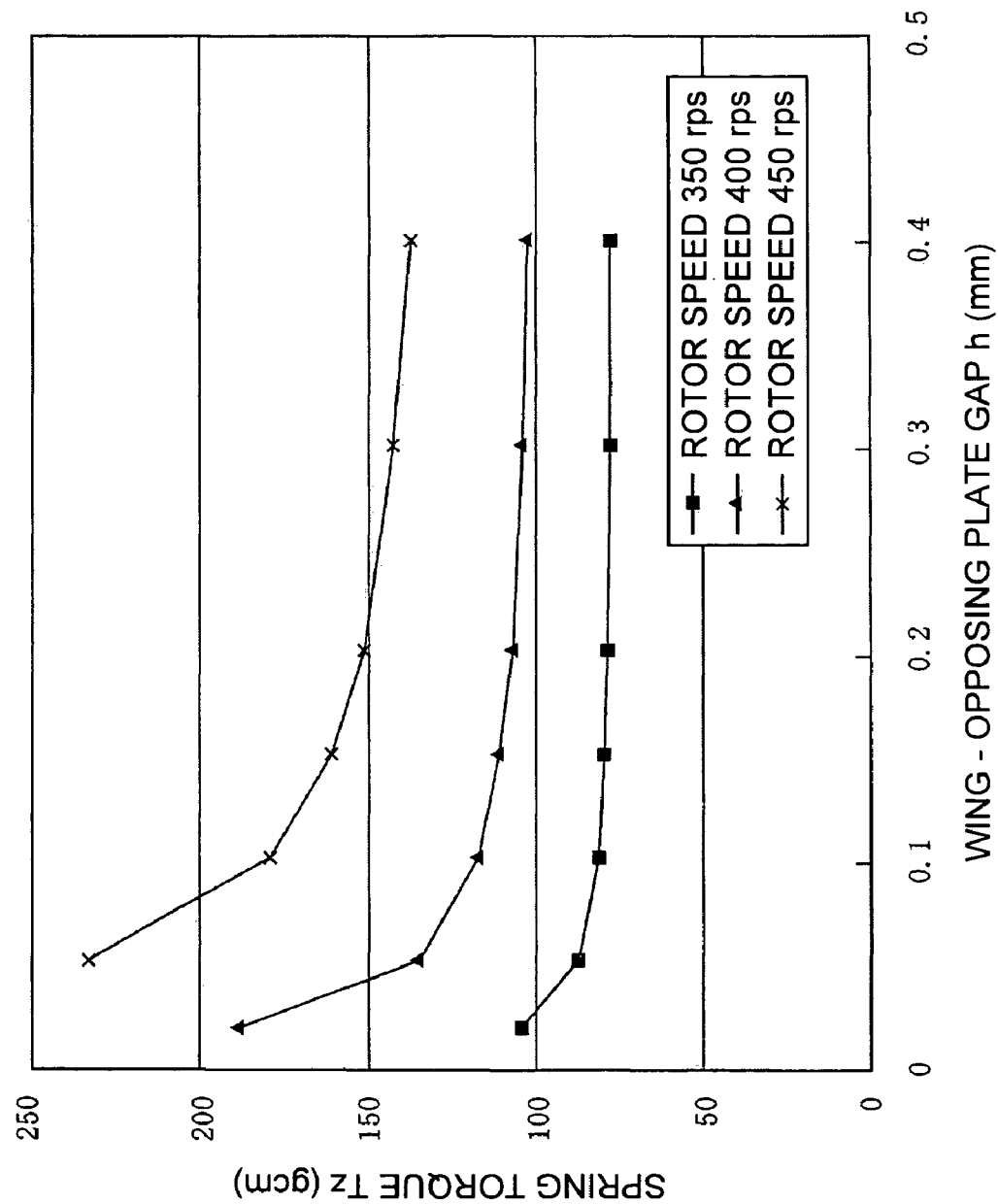
FIG. 20 is a graph showing test results using a working model of the invention.
Figure 21:
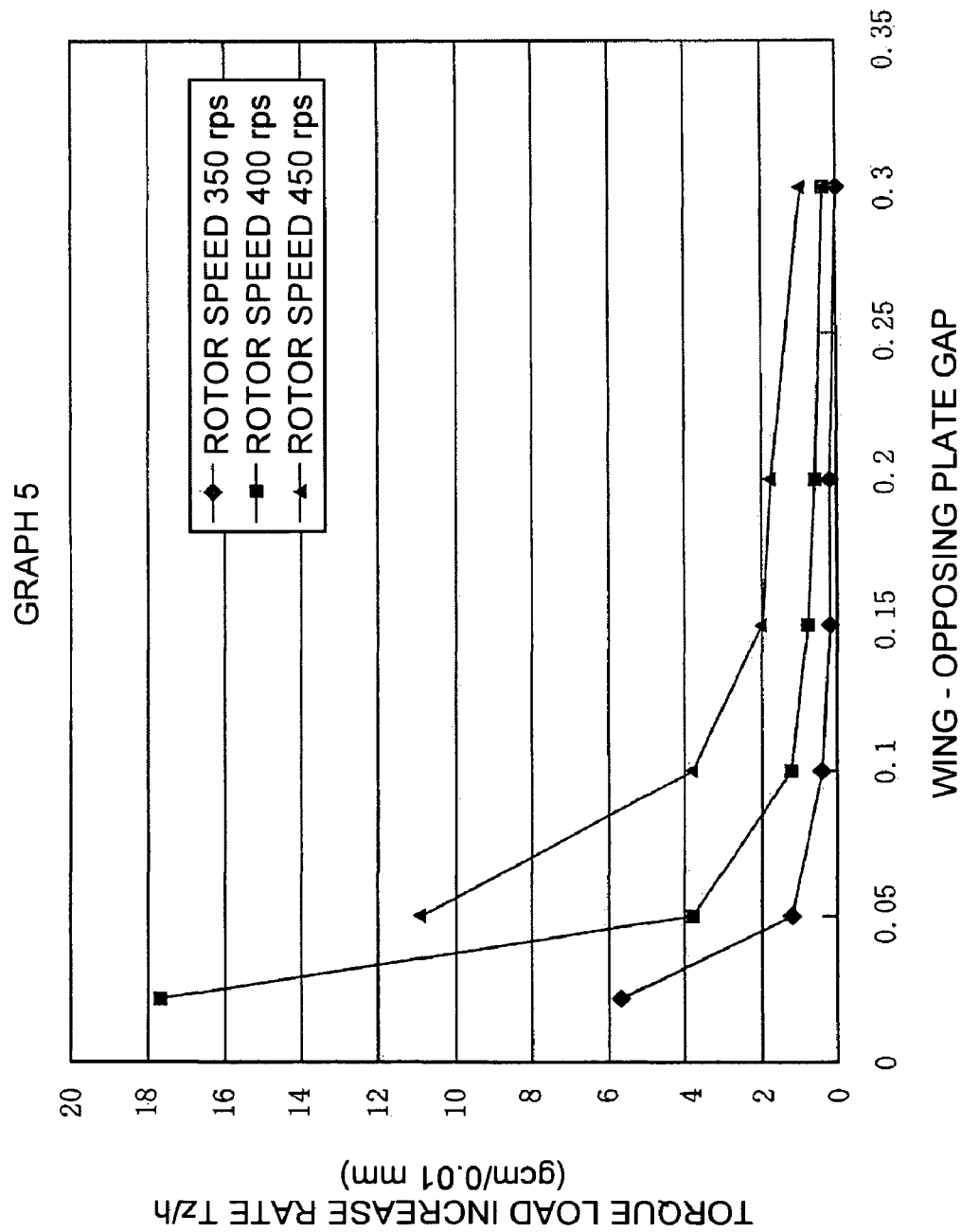
FIG. 21 is a graph showing test results using a working model of the invention.

From the results shown in graph 4 and graph 5 in FIG. 20 and FIG. 21, sufficient brake power is achieved using air as the viscous fluid and the brake power can be adjusted by adjusting the gap between the wings 210 and opposing plates 233 if the gap between the wings 210 and opposing plates 233 (where the top plate to wing gap=the bottom plate to wing gap) is 0.15 mm or less. If this gap is greater than 0.15 mm, the brake power is substantially constant and unadjustable regardless of the size of the gap, and the brake power is also low.

If the gap is excessively small, the wings and opposing plates could touch as a result of tilting caused by the rotor, the wings fluttering, or play between the tenons and jewels, and the adjustment required to prevent this contact is extremely difficult. Setting the gap to 0.03 mm or more therefore offers the advantage of easy adjustment.

The gap between the wings 210 and the opposing plates 233 in this embodiment of the invention is therefore preferably greater than or equal to 0.03 mm and less than or equal to 0.15 mm. When the governor 2 is assembled into a small apparatus such as a wristwatch, the governor 2 is expected to be designed to the size used in these tests, and this gap is therefore preferably set to the dimensions described above.

However, if the governor is used in a larger device such as a pocket watch or mantle clock and the size of the wings 210 can be increased, the gap between the wings 210 and opposing plates 233 can be set greater than or equal to 0.15 mm as needed to achieve the required brake power.

Variation in rotor speed (angular velocity □) when the spring then unwinds and the spring torque drops was determined by simulation in a second test using a governor having movable wings according to the present invention and a governor without wings.

The conditions used in this simulation are shown below.

Speed increasing ratio from the barrel wheel to the rotor: 95,653 times

Number of tooth engagements in the wheel train from the barrel wheel to the rotor: 8

Diameter of the wing guide plate in the rotor: 4 mm

Wing weight (1 wing): 0.0031 g

Number of wings: 2

Wing shape: as described in the first embodiment (the wing shape shown in FIG. 2A and FIG. 2B)

Opposing plate to wing gap: wing to top plate gap=wing to bottom plate gap=0.05 mm Spring coefficient of wing return spring (zigzag spring): 58.52 N/m Diameter of opening in opposing plates: 4.5 mm Maximum output torque of spring: 0.0123 N·m ($\approx$125 gcm)

Maximum number of spring winds: 8.4

The angular velocity of the rotor as the spring unwinds and spring torque gradually decreases was simulated under the above conditions.

A hammer or other load was not considered in this simulation. Friction resistance from the barrel wheel to the rotor, and viscous resistance from lubrication oil in the bearings, were also not considered. This is because the effect is small even if they are [not, sic] considered.

The resistance of air viscosity from the barrel wheel to the last gear before the rotor was also not considered because the wheels turn slowly compared with the rotor and air viscosity has substantially no effect.

The rotor was treated as a cylinder until the wings entered between the opposing plates, and only the effect of air viscosity on the surface of the rotor was considered with respect to the air viscosity applied to the rotor. This also applied to the wingless rotor used for comparison in the simulation.

After the wings entered between the opposing plates, the resistance of air viscosity working on the hypothetically cylindrical rotor surface plus the resistance of air viscosity working between the wings and the opposing plates was used as the total resistance of air viscosity working on the rotor.

The angular velocity of the rotor was determined as follows in the simulation.

The torque applied by the spring was set based on the number of times the spring was wound, and rotor speed was calculated from this torque and the inertial moment of the rotor. The centrifugal force acting on the wings was obtained based on the rotor speed, the displacement (position) of the wings was calculated from this centrifugal force and the urging force of the wing returning spring, the area of the portion of the wings between the opposing plates was determined if the wings were between the opposing plates, and the resistance of air viscosity over that area was calculated. The viscous braking torque applied to the rotor and the angular velocity of the rotor were then obtained from the distance from the center of rotor rotation to the part of the wings affected by the air viscosity resistance and the specific resistance of the air viscosity.

Figure 22:
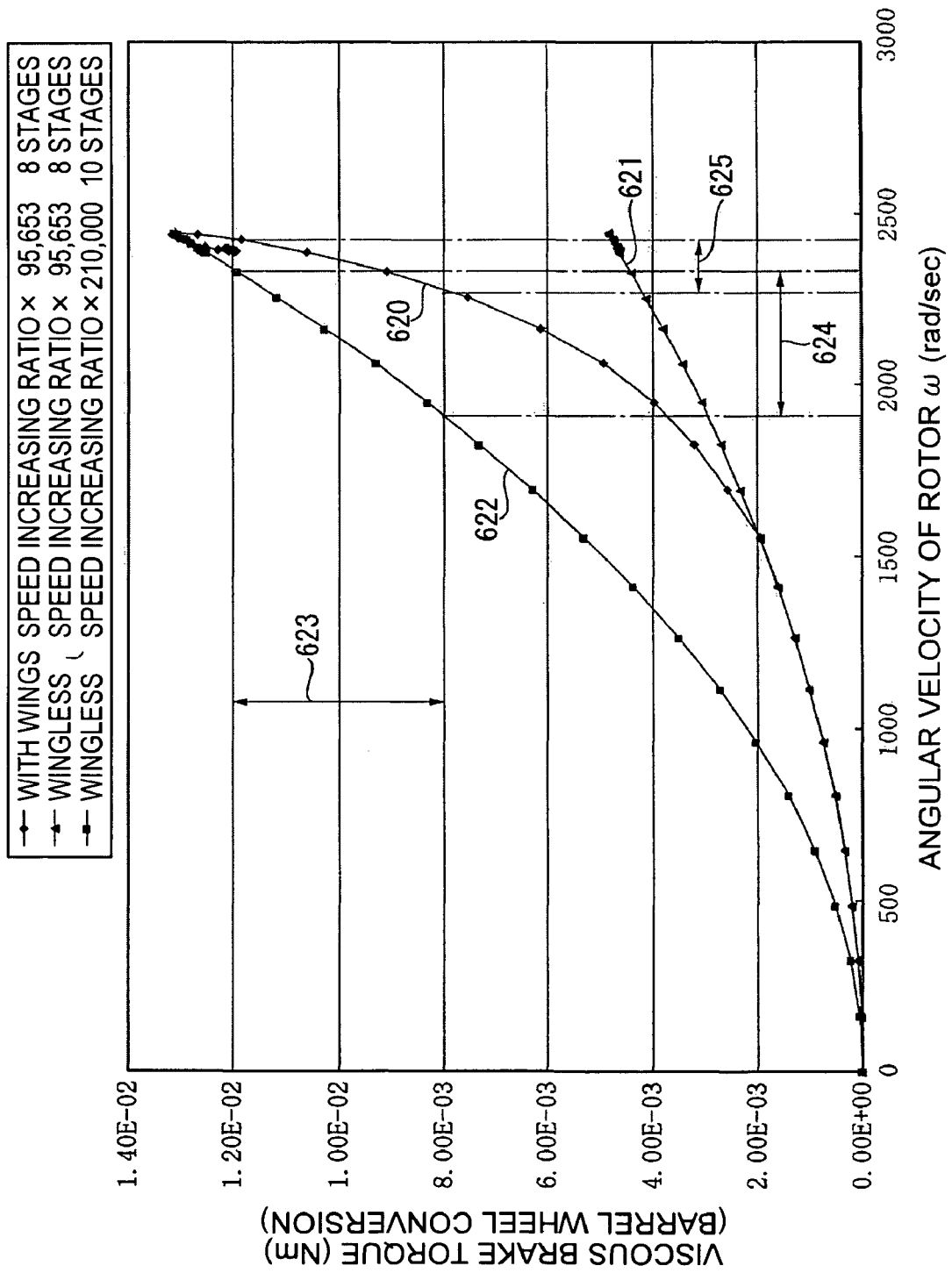
FIG. 22 is a graph showing simulation results using another working model of the invention.

Spring torque as the spring unwound was sequentially calculated from the spring characteristics, and the calculations described above were repeatedly solved based on the calculated spring torque to obtain the simulation results shown in FIG. 22.

FIG. 22 shows the relationship between the rotor velocity and the viscous brake torque applied to the barrel wheel. Curve 620 shows the relationship between the rotor velocity and the viscous brake torque using a governor with movable wings according to the present invention, and curve 621 shows the results using the same governor without wings.

As will be known from these results, the governor according to the present invention behaves the same as the wingless governor until the wings enter between the opposing plates, but when the angular velocity of the rotor increases and the wings enter between the opposing plates, the viscous brake torque increases sharply.

The maximum viscous brake torque without wings is therefore 0.005 N·m or less as shown by curve 621 and is less than approximately half of the maximum spring torque. Sufficient brake torque therefore cannot be applied and rotor rotation cannot be governed to a constant speed.

When movable wings are used, however, viscous brake torque comparable to the maximum output torque of the spring is produced, and rotor speed can be reliably governed to a constant speed.

Furthermore, in order to produce viscous brake torque comparable to the maximum output torque of the spring when using a wingless rotor, a speed increasing gear ratio of 210,000 times and ten meshing stages in the wheel train are required as indicated by curve 622.

In addition, as indicated by arrow 623 in FIG. 22, when the spring unwinds 5.5 turns from 7.5 winds to 2.0 winds, and the spring torque changes from approximately 0.0118 N·m to 0.00785 N·m, the rotational speed of the wingless rotor denoted by curve 622 varies approximately 18.5% from $372s^{-1}$ (=372rps) to $303s^{-1}$ as indicated by arrow 624. With the present invention as indicated by arrow 625, however, the rotor speed varies from $386s^{-1}$ to $362s^{-1}$ or only approximately 6.2%.

The spring normally takes over 48 hours to unwind 5.5 times. With the wingless rotor denoted by curve 622, therefore, operation of the sonnerie mechanism, or more specifically driving the hammer, when the spring has unwound to 2.0 winds is slightly less than 20% different from the operation 48 hours earlier when the spring was wound 7.5 winds, and the user may notice the change in the striking interval of the sonnerie mechanism. In contrast, the present invention suppresses this variation to only about 6%, the gong can therefore be struck at substantially the same interval even though the spring torque varies, stable operation can be maintained, and the utility of the present invention was thus verified.

Therefore, description of specific shapes, materials and other aspects of the foregoing embodiments are used by way of example only to facilitate understanding the present invention and in no way limit the scope of this invention, and descriptions using names of parts removing part or all of the limitations relating to the form, material, or other aspects of these embodiments are also included in the scope of this invention.

As used herein, the following directional terms "forward, rearward, above, downward, vertical, horizontal, below and transverse" as well as any other similar directional terms refer to those directions of an apparatus equipped with the present invention. Accordingly, these terms, as utilized to describe the present invention should be interpreted relative to an apparatus equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A governor comprising:
   a rotor;
   a first wing being configured to extend perpendicularly to a rotational axis of said rotor and being outwardly movable in a radial direction by a centrifugal force of rotation of said rotor;
   a first wing returning unit being connected to said rotor and said first wing to move inwardly said first wing in the radial direction of said rotor; and
   an opposing object being arranged on a side outside the circumference of said rotor and in a place at a prescribed distance outside the outermost position of said first wing,
   said opposing object having a first opposing plate configured to extend in parallel to said first wing and a second opposing plate configured to extend in parallel to said first wing,
   at least a portion of said first wing being rotatable between in an axial direction and inside in the radial direction said first plate and said second plate at a prescribed distance away from said first plate and at a prescribed distance away from said second plate.

2. The governor according to claim 1, further comprising an excessive wing movement prevention unit configured to prevent said first wing from outwardly moving further than a predetermined position.

3. The governor according to claim 1, wherein the profile of an outside portion of said first wing is shaped to overlap a circle that is concentric to the rotational axis of said rotor when said first wing is at the outermost position.

4. The governor according to claim 1, wherein said first wing returning unit is a flat zigzag spring.

5. The governor according to claim 1, further comprising a second wing configured to extend perpendicularly to the rotational axis of said rotor and outwardly movable in the radial direction by the centrifugal force of the rotation of said rotor, said second wing configured in a position to be balanced with respect to the rotational axis and said first wing, and
   at least a portion of said second wing rotates between said first plate and said second plate at a prescribed distance away from said first plate and at a prescribed distance away from said second plate.

6. The governor according to claim 5, further comprising a second wing returning unit connected to said rotor and said second wing to move inwardly said first wing in the radial direction of said rotor.

7. The governor according to claim 6, wherein said second wing returning unit is a flat zigzag spring and is integrally configured with said first wing retuning unit.

8. The governor according to claim 1, further comprising a gap adjusting unit that adjusts the gap between said first wing and said first opposing plate.

9. The governor according to claim 1, further comprising a horizontal distance adjustment unit that adjusts the distance between said opposing object and the rotational axis of said rotor.

10. The governor according to claim 1, wherein the distance between said first wing and said first opposing plate is shorter than 0.15 mm.

11. The governor according to claim 10, wherein the distance between said second wing and said second opposing plate is less than 0.15 mm.

12. The governor according to claim 10, wherein a viscose fluid between said first wing and said first opposing plate is air.

13. The governor according to claim 1, wherein said opposing object has a spacer configured between said first plate and said second plate, and
    the profile of an inner surface of said spacer has a curvature concentric to the rotational axis of said rotor, and the profile of an outside portion of the first wing has a curvature that is identical to a circle that is concentric to a circle having the curvature of said inner surface of said spacer.

14. The governor according to claim 1, further comprising a wing axis configured on said first wing at a position closer to the rotational axis than to the center of mass of said first wing, said wing axis rotatably connecting said first wing to said rotor.

15. The governor according to claim 14, wherein a connecting point of said first wing returning unit and said first wing is arranged closer to the rotational axis of said rotor than to the center of mass of said first wing.

16. An apparatus, comprising:
    a governor having
    a rotor,
    a wing being configured to extend perpendicularly to a rotational axis of said rotor and being outwardly movable in a radial direction by a centrifugal force of rotation of said rotor,
    a wing returning unit being connected to said rotor and said wing to move inwardly said wing in the radial direction of said rotor, and
    an opposing object being arranged on a side outside the circumference of said rotor and in a place at a prescribed distance outside the outermost position of said first wing; and an operating unit being governed by said governor, said opposing object having a first opposing plate configured to extend in parallel to said wing and a second opposing plate configured to extend in parallel to said wing, at least a portion of said wing being rotatable between in an axial direction and inside in the radial direction said first plate and said second plate at a prescribed distance away from said first plate and at a prescribed distance away from said second plate.

17. The apparatus according to claim 16, further comprising
a drive part,
a time display part connected to said drive part and displaying time information, and
a case accommodating said governor, said operating unit, said drive part, and said time display part.

18. The apparatus according to claim 17, wherein said operating unit sounds.

\* \* \* \* \*